April 10, 1956 C. W. MUSSER 2,741,160
HEAVY CALIBER RECOILLESS GUN
Filed July 1, 1948 14 Sheets-Sheet 3
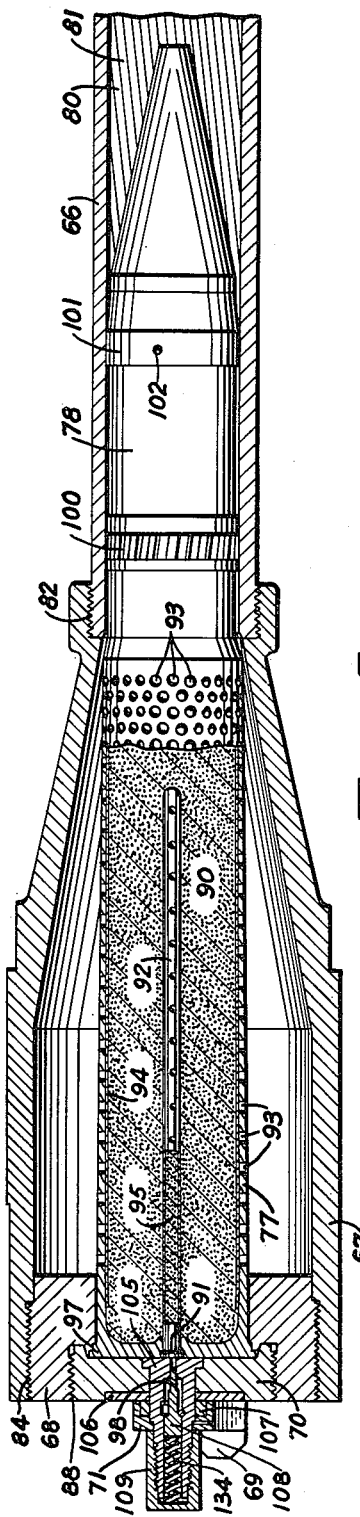
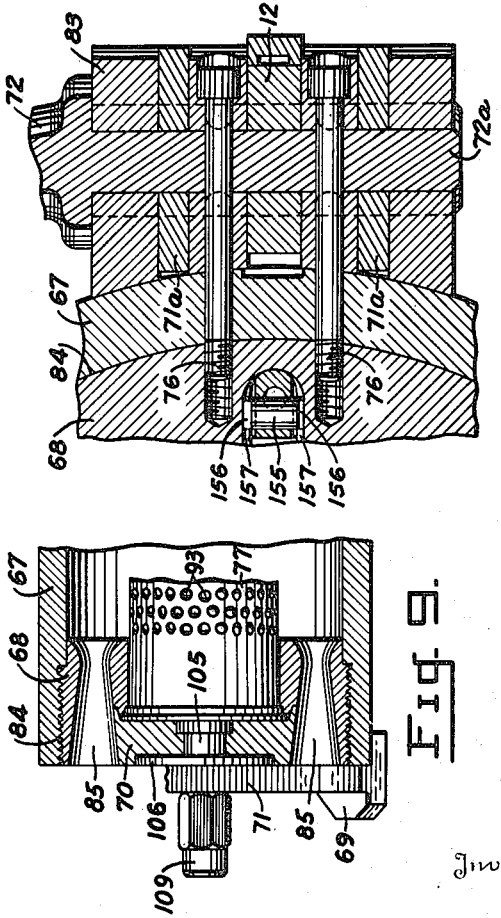
Inventor
C. WALTON MUSSER.
By J. H. Church & H. E. Thibodeau
Attorneys

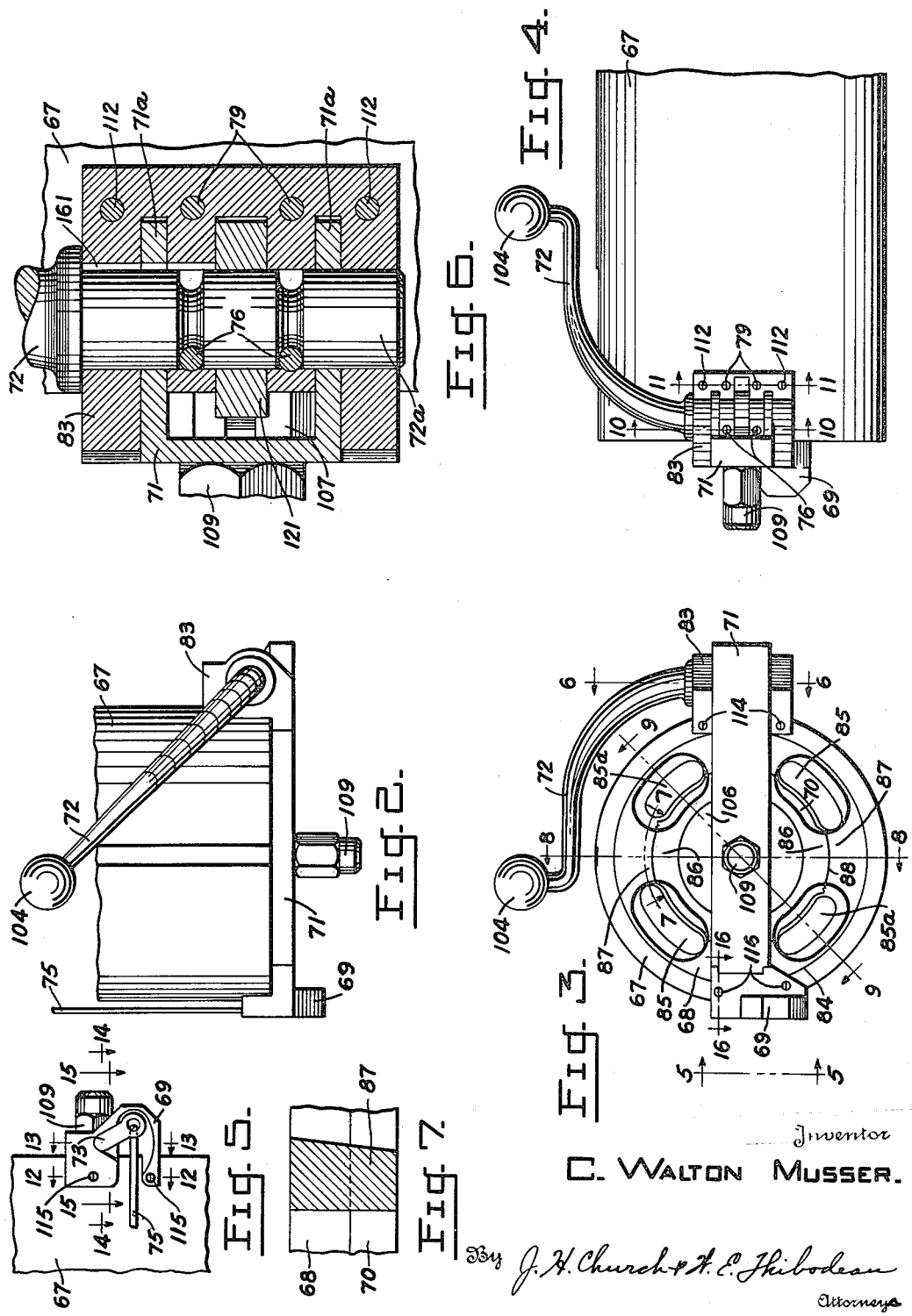

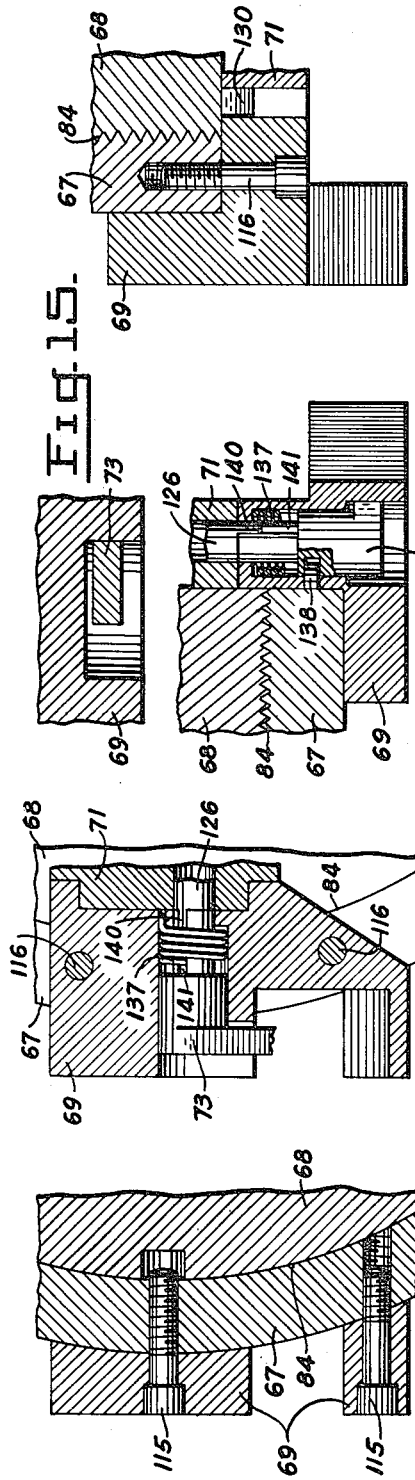

April 10, 1956
C. W. MUSSER
2,741,160
HEAVY CALIBER RECOILLESS GUN
Filed July 1, 1948
14 Sheets-Sheet 5
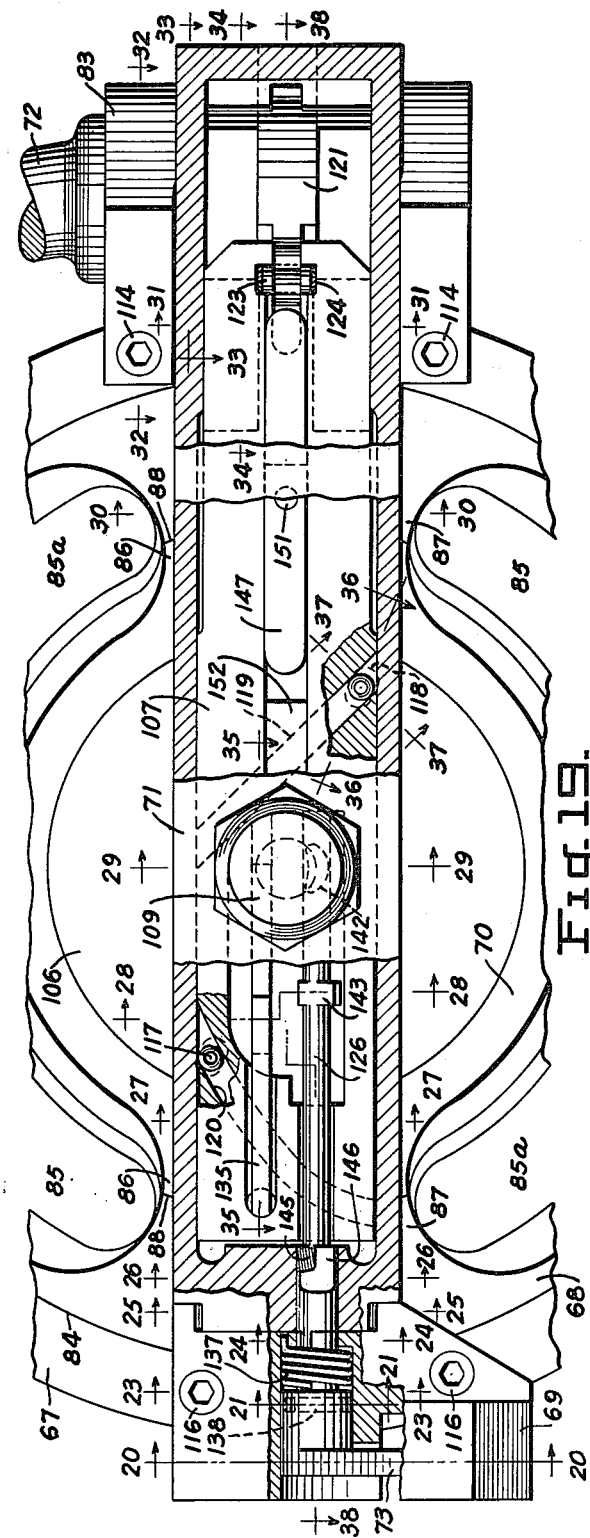
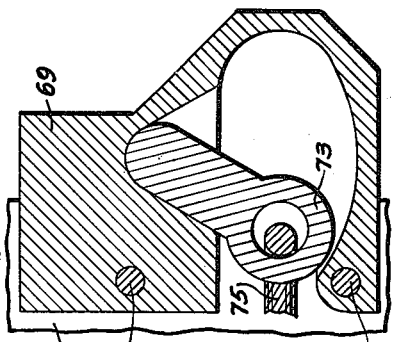
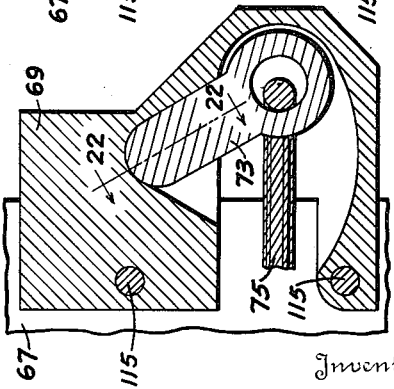
Inventor
C. WALTON MUSSER.
By J. H. Church & H. E. Thibodeau
Attorneys

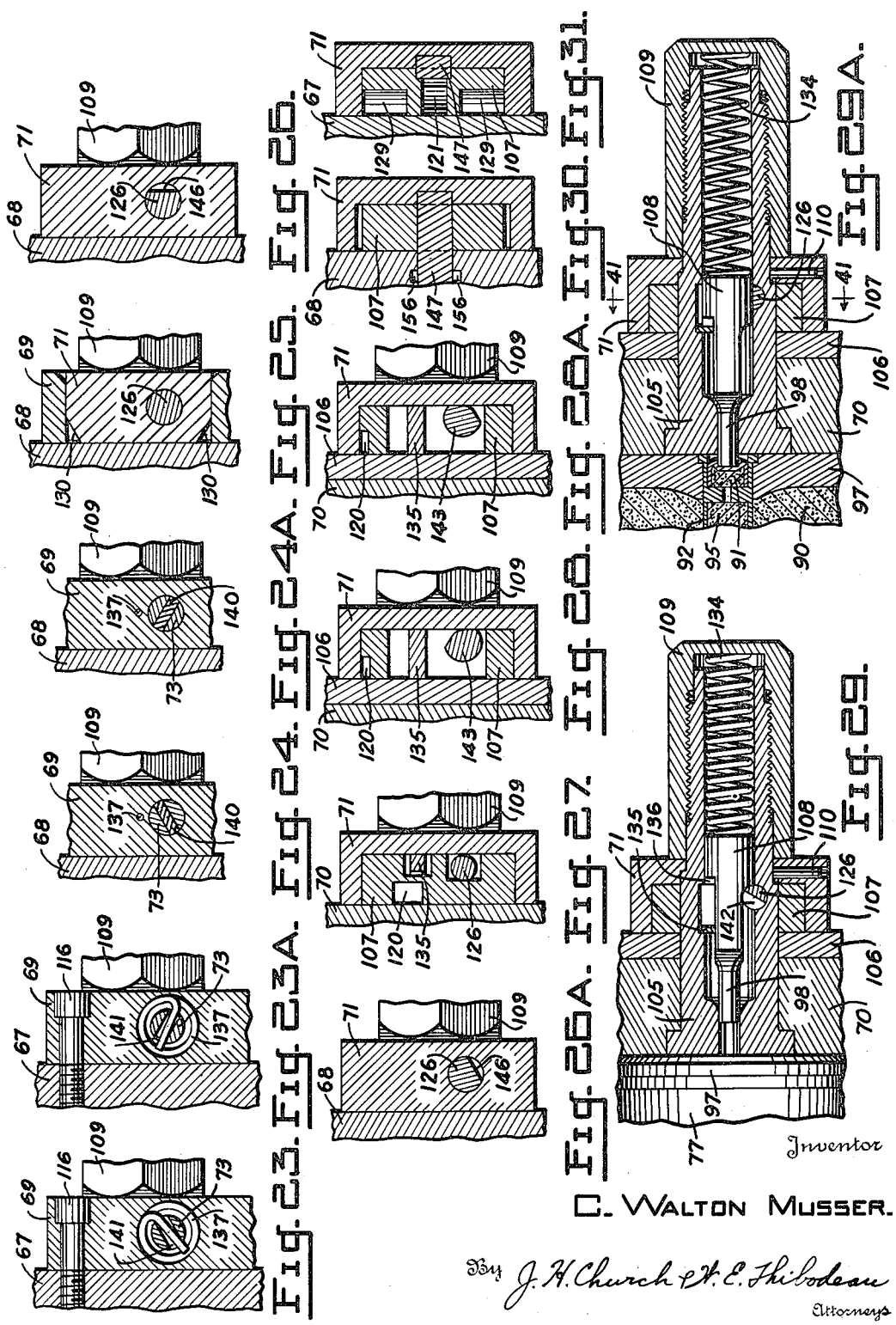

April 10, 1956 — C. W. MUSSER — 2,741,160
HEAVY CALIBER RECOILLESS GUN
Filed July 1, 1948 — 14 Sheets-Sheet 7
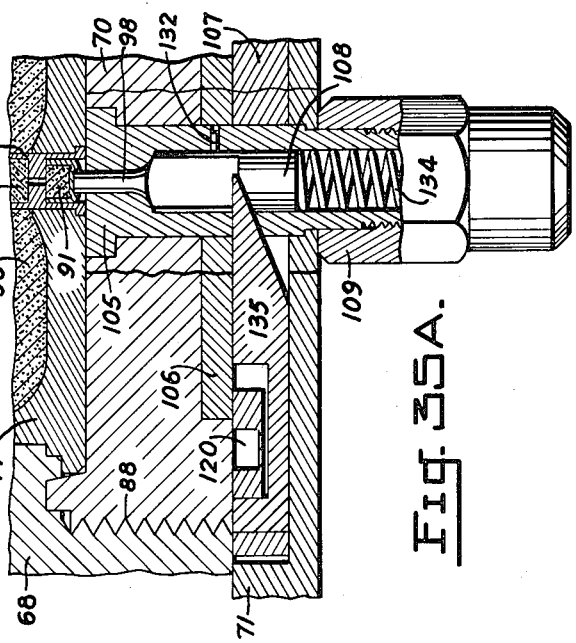
Fig. 34.
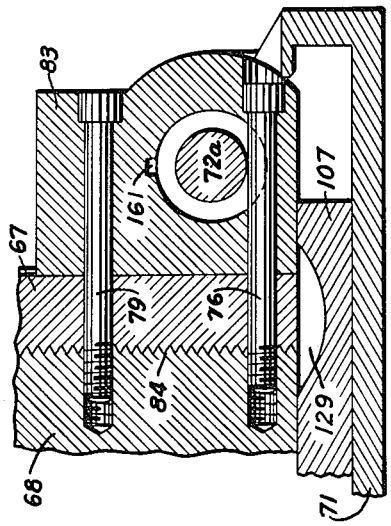
Fig. 33.
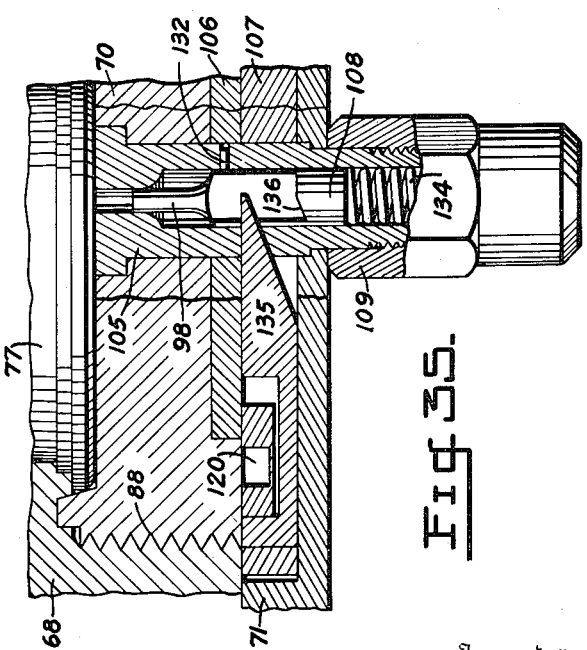
Fig. 35.
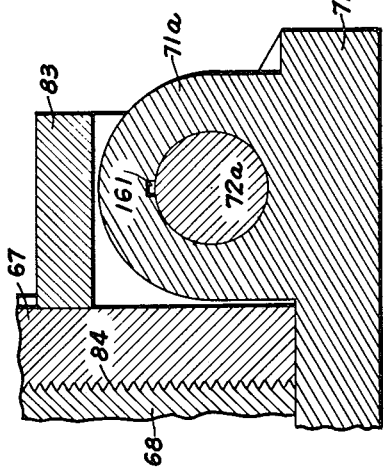
Fig. 32.
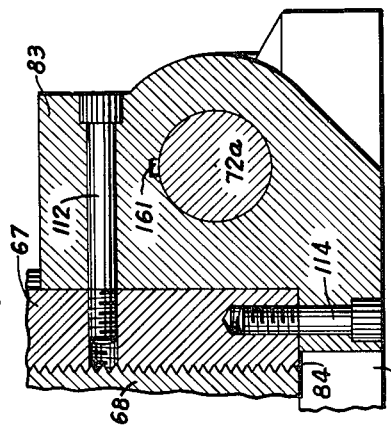
Inventor
C. WALTON MUSSER.
By J. H. Church & W. E. Thibodeau
Attorneys

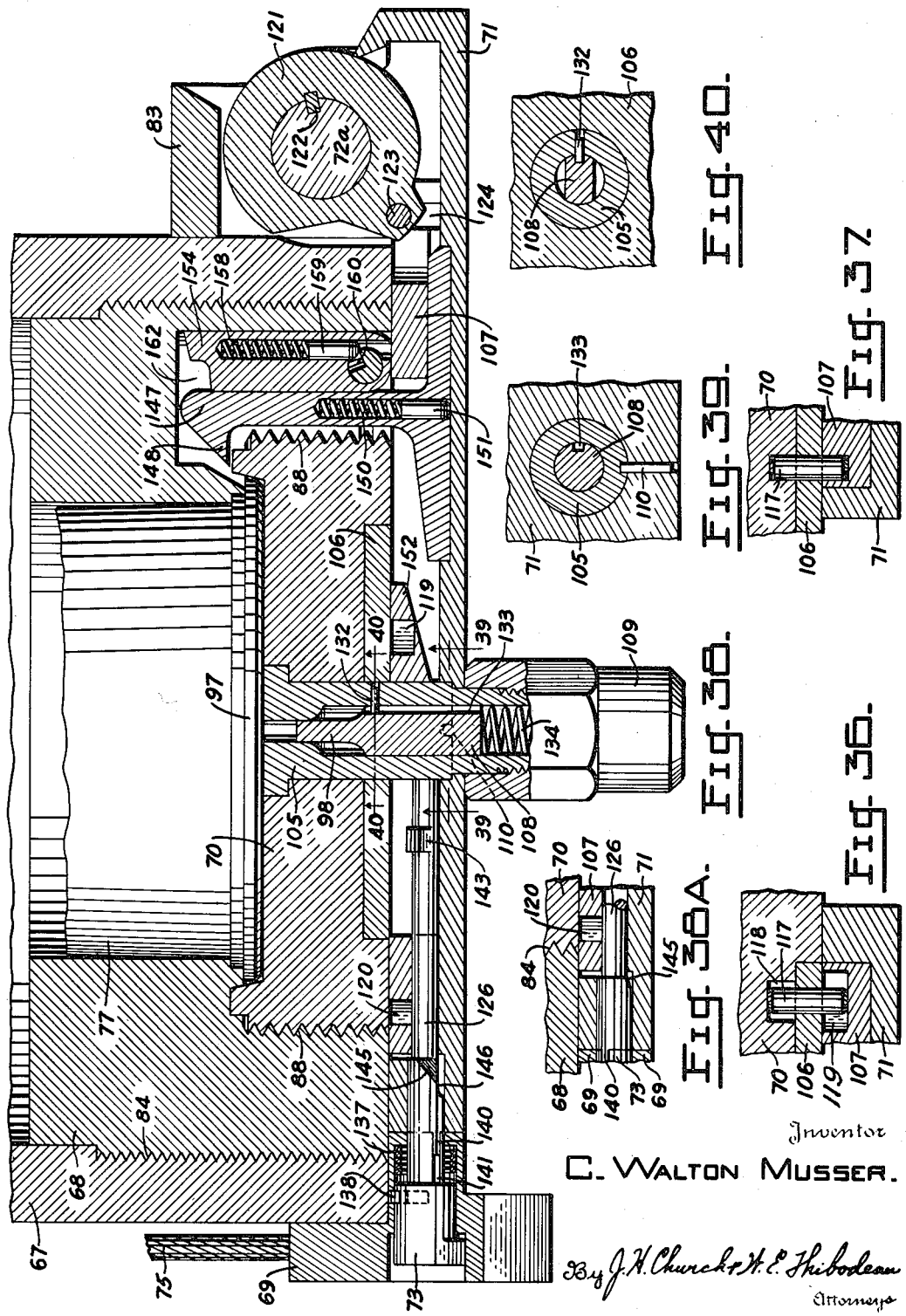

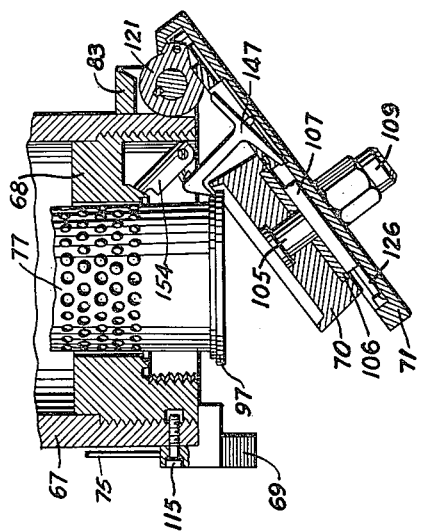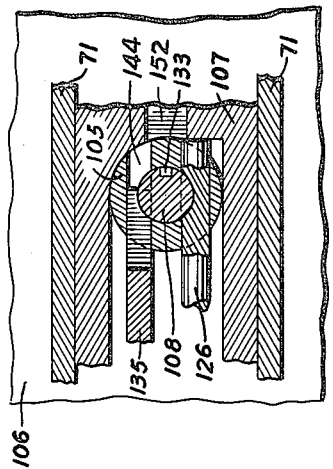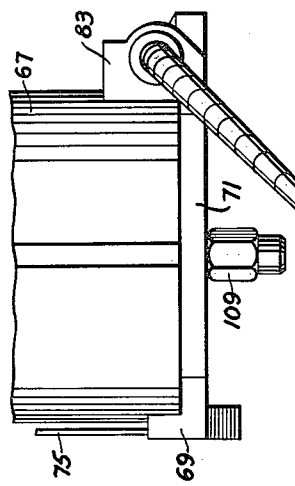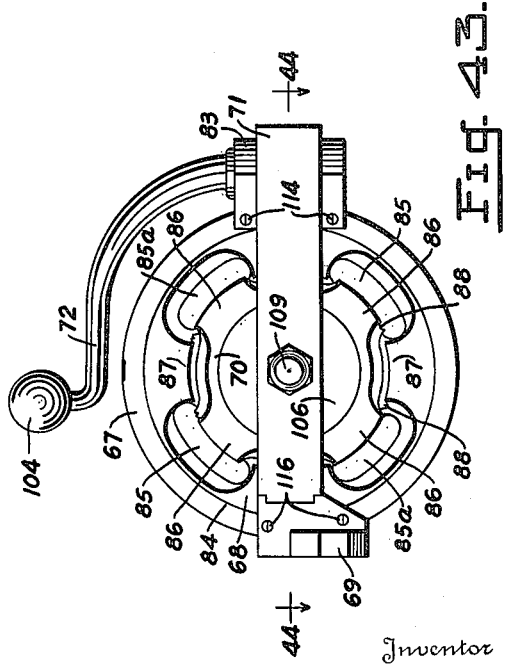

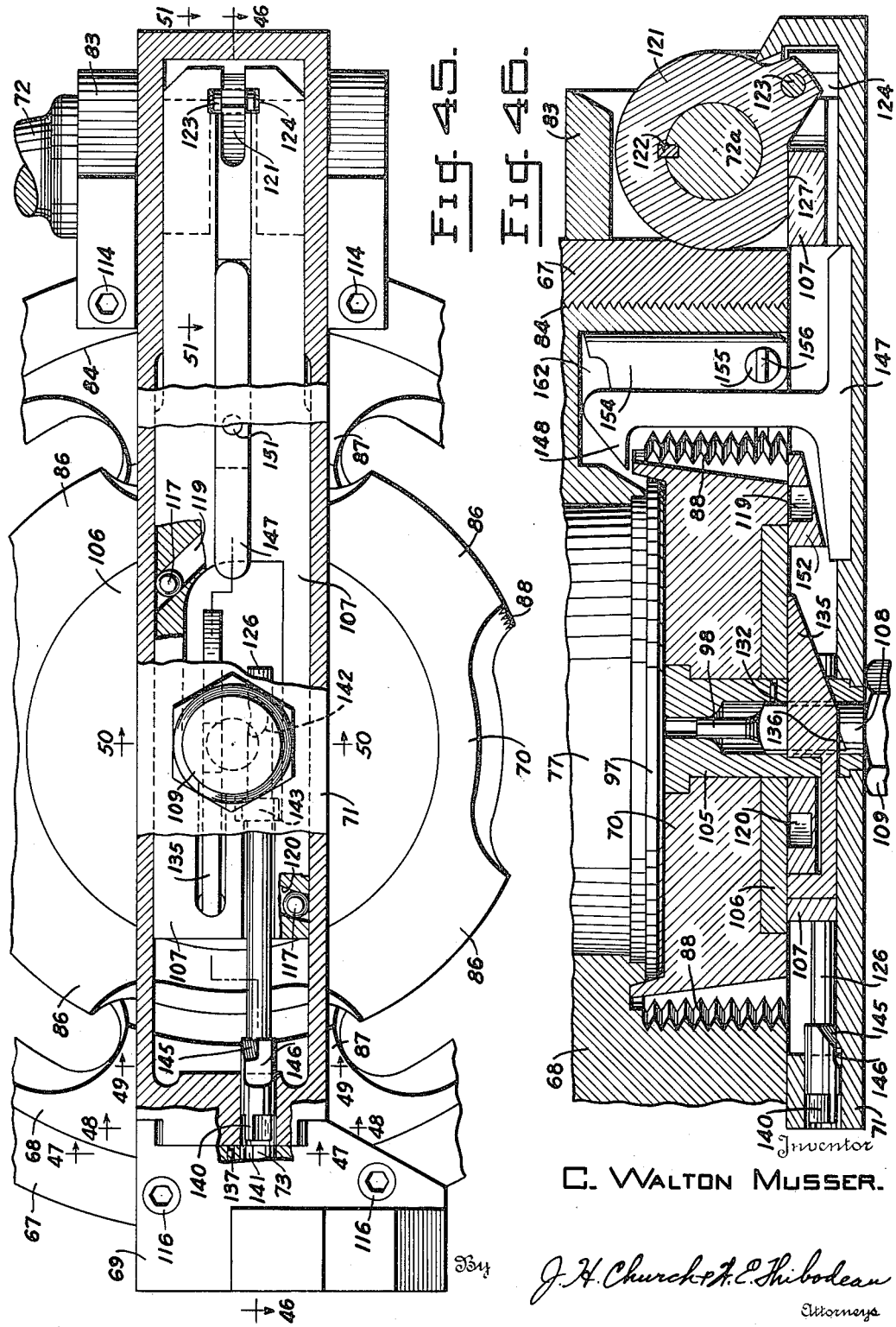

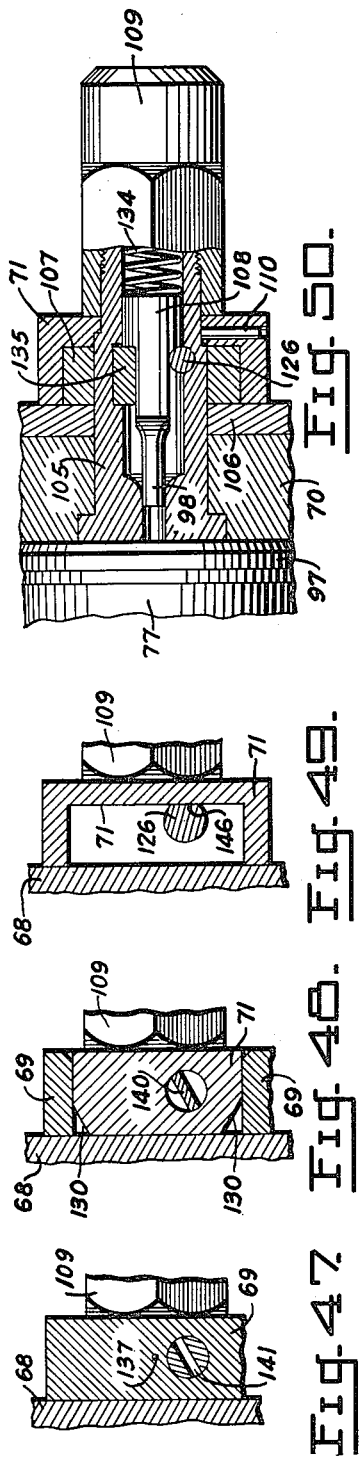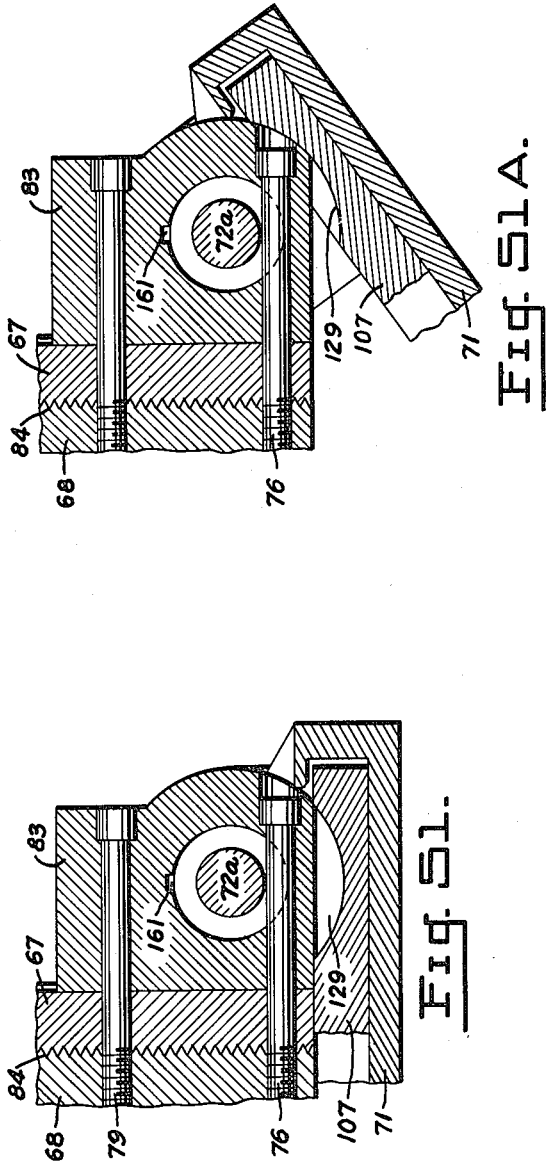

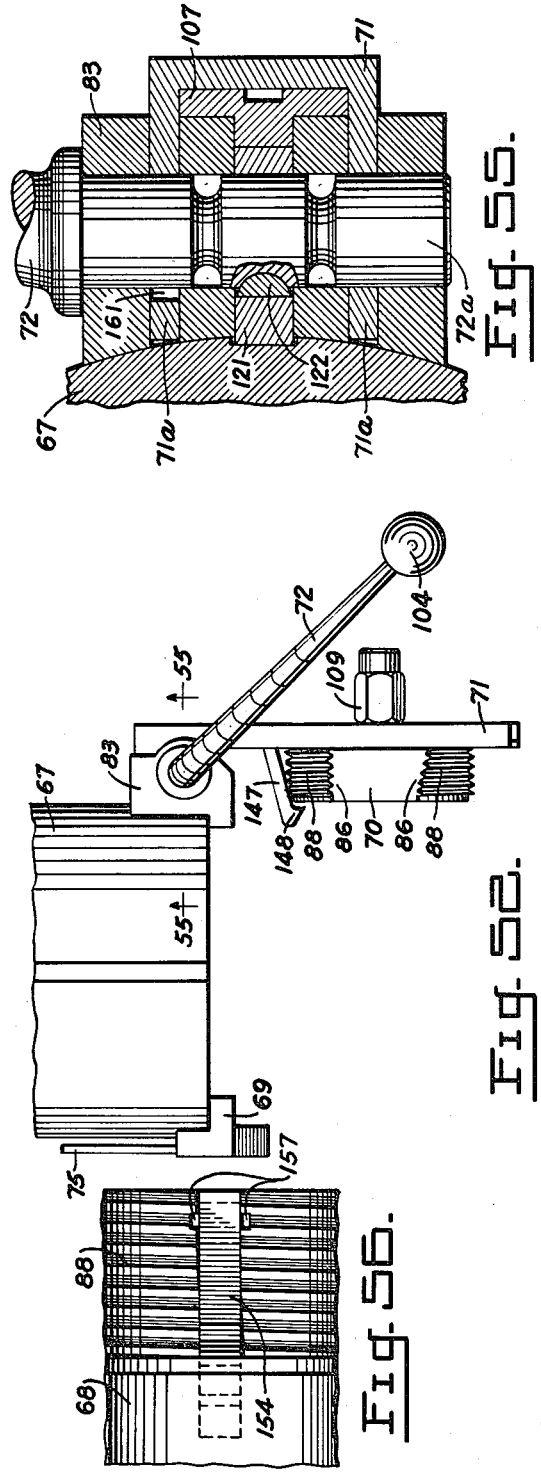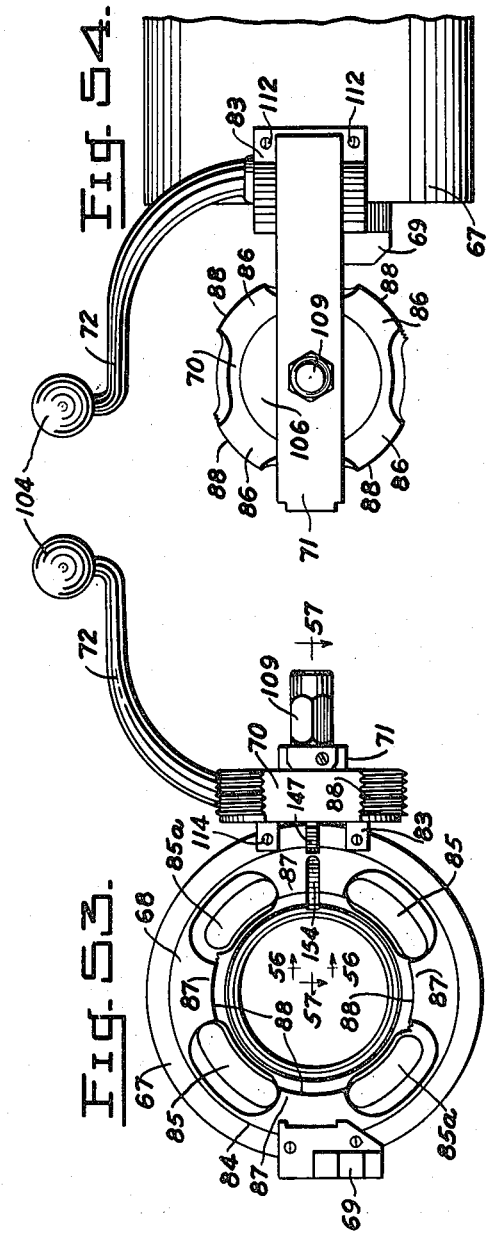

April 10, 1956  C. W. MUSSER  2,741,160
HEAVY CALIBER RECOILLESS GUN
Filed July 1, 1948  14 Sheets-Sheet 13

Inventor
C. WALTON MUSSER.
By J. H. Church & H. E. Thibodeau
Attorneys

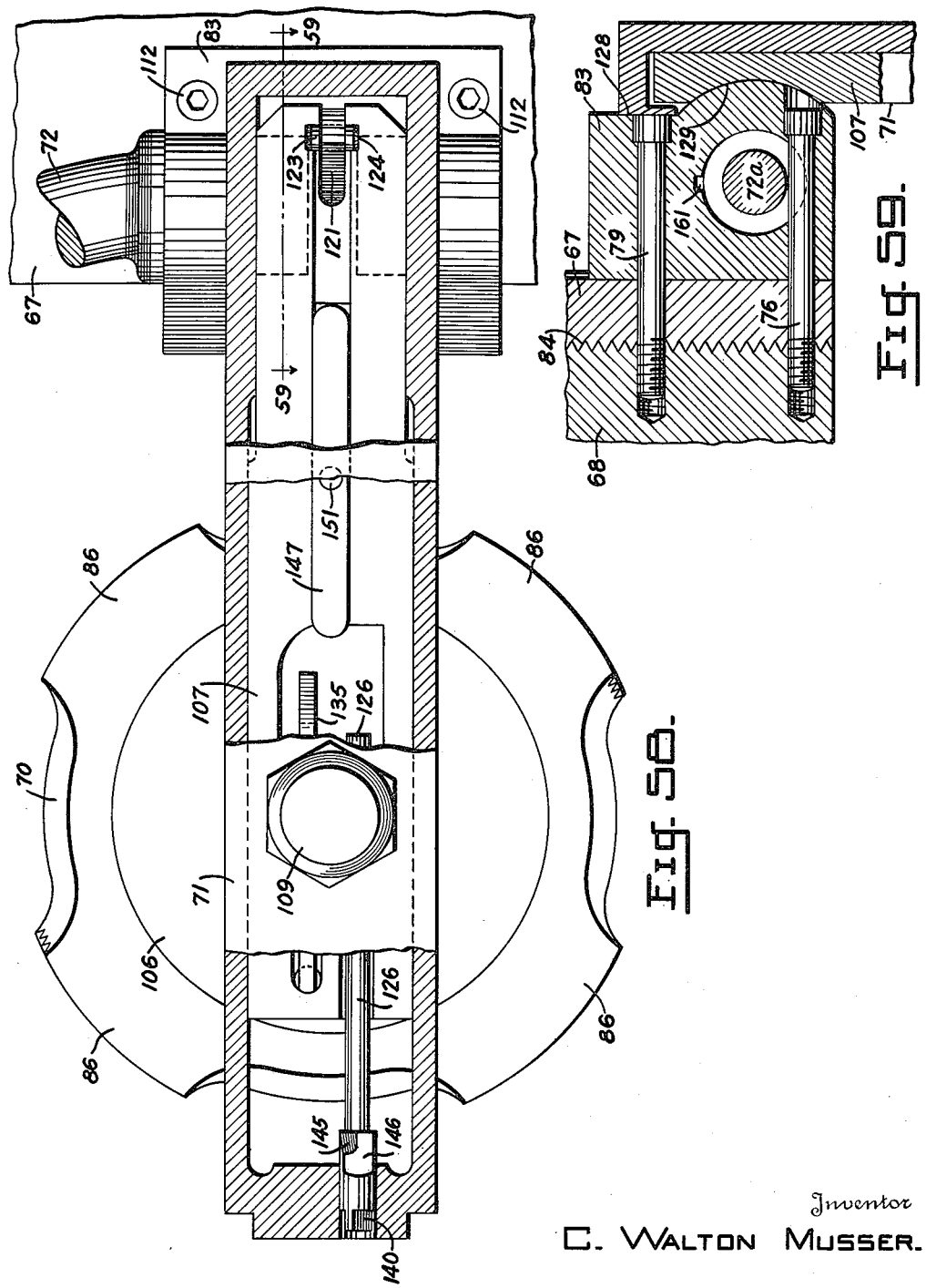

United States Patent Office 2,741,160
Patented Apr. 10, 1956

2,741,160

HEAVY CALIBER RECOILLESS GUN

Clarence Walton Musser, Philadelphia, Pa., assignor to the United States of America as represented by the Secretary of War Application July 1, 1948, Serial No. 36,506

7 Claims. (Cl. 89—1.7)

(Granted under Title 35, U. S. Code (1952), sec. 266)

The invention described in the specification and claims may be manufactured and used by or for the Government for governmental purposes without the payment of any royalty thereon.

The present application is a continuation-in-part of Serial No. 677,947, filed on June 20, 1946, now abandoned, in the name of Clarence W. Musser for "Heavy Caliber Recoilless Firearm."

This invention relates to guns of the recoilless type and it has special reference to nonrecoil guns wherein the forces of rearward reaction that result from projectile discharge are neutralized by forwardly acting counter-forces simultaneously set up by a rearward escape of propellent powder gas through openings or orifices in the gun's breech.

Broadly stated, the object of this invention is to provide light weight and otherwise improved designs for heavy caliber recoilless guns which incorporate principles of construction earlier disclosed and claimed by the following co-pending applications: (a) Kroeger-Musser Serial No. 536,590, filed May 20, 1944, now abandoned, for "Recoilless Fire arm, Ammunition Therefore and Ballistic Design Thereof"; (b) Kroeger-Musser Serial No. 577,830 filed February 14, 1945 for medium caliber "Recoilless Firearm and Ammunition Therefor", which application has matured into United States Patent No. 2,472,111; (c) Musser Serial No. 605,614, filed July 17, 1945 for "Method and Apparatus for Aligning Pre-Engraved Projectiles in Rifled Firearms", which application has matured into United States Patent No. 2,456,011 entitled "Aligning Device For Pre-engraved Projectiles"; and (d) Musser Serial No. 628,647, filed November 14, 1945 for "Recoilless Firearm" with Replaceable Chamber Liner, which application has matured into U. S. Patent No. 2,444,949.

A more specific object is to make available an improved gun construction which reduces the time and skill required to safely load and fire recoilless weapons of heavy caliber typified by 105 millimeter barrel diameter.

Another object is to simplify the structure and reduce the number of parts needed by the gun's breech and firing mechanism and to arrange those parts in a uniquely compact manner.

A further object is to provide "foolproof" constructions which assure simplicity of assembly and which make incorrect assembly impossible.

A still further object is to completely enclose the breech and firing mechanism parts to assure trouble-free operation under all service conditions including the most adverse.

An additional object is to guard all critical parts of the gun from possible mechanical damage due to rough handling and other abuse.

A further added object is to incorporate "double safety" features into the breech and firing mechanism design.

A supplemental object is to provide positive means of retaining the ammunition round in the gun chamber while the breech is being closed preparatory to high elevation firing.

Other objects and advantages will become apparent as the disclosure and description hereof proceed.

In accomplishing the foregoing, incorporation has been made in the new heavy caliber gun of the "annular breech orifice," the "perforated cartridge case," the "torque compensation," the "tapered chamber," and the "replaceable reliner" principles which the co-pending applications earlier named broadly cover. In supplement thereto provision is made for improved breech and firing mechanism constructions which are simpler, more compact and rugged, and which are coordinated in a unique way that permits quicker, safer, and more convenient loading and firing.

The invention itself, together with illustrative embodiments thereof, will best be understood from the following description when taken in conjunction with the accompanying drawings wherein:

Fig. 2 is a top plan view of the breech end of the gun with the breech block thereof in fully closed position;

Fig. 3 shows the weapon in rear elevation with the breech block thereof also fully closed;

Fig. 4 is a right-side elevation of the breech end of the gun again showing the operating handle and mounting therefor;

Fig. 5 is a left-side elevation, along line 5—5 of Fig. 3, of the trigger and trigger housing portion of the gun's breech end;

Fig. 6 is an enlarged section on line 6—6 of Fig. 3 showing how the operating handle is related to certain cooperating parts;

Fig. 7 is a section on line 7—7 of Fig. 3 showing the taper of one of the breech locking lugs;

Fig. 8 is a longitudinal section on line 8—8 of Fig. 3 illustrating the gun's internal construction and showing an ammunition round in place;

Fig. 9 is a section on line 9—9 of Fig. 3 showing the breech orifice openings and chamber reliner construction;

Figure 1:
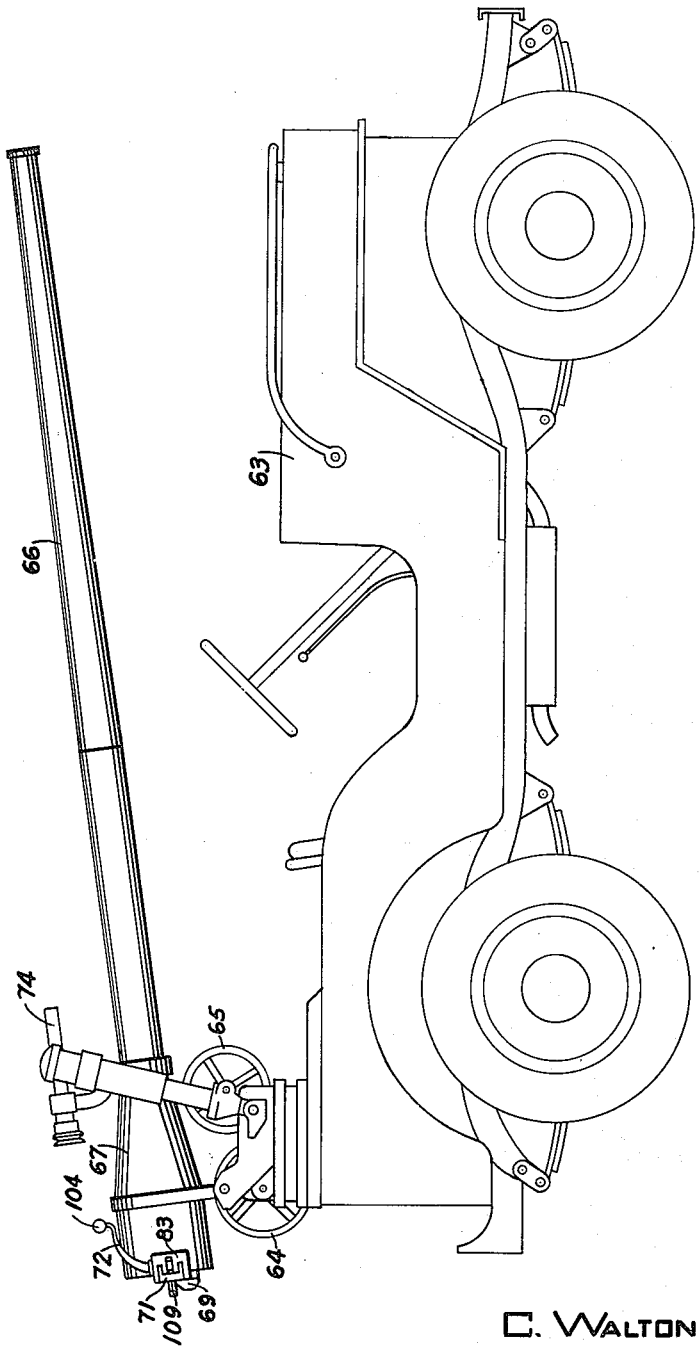
Fig. 1 is a view in side elevation of a recoilless gun of 105 mm. caliber incorporating the inventive features hereof and shown as being mounted on a military vehicle of well-known "jeep" type.
Figure 57A:
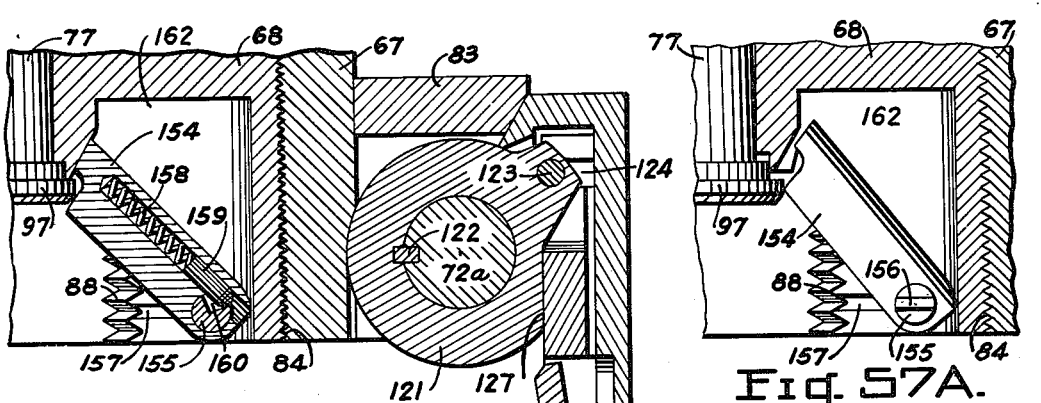
Figure 57:
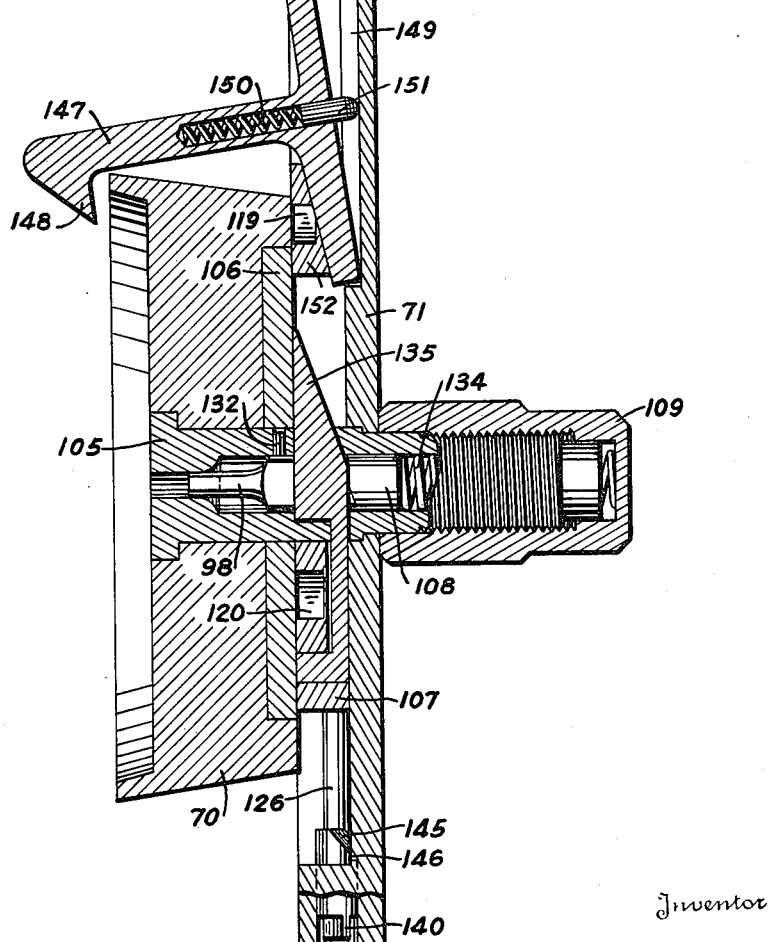

Figs. 10 and 11 are enlarged sections on lines 10—10 and 11—11 of Fig. 4 showing how the hinge block is fastened to the chamber's right side;

Fig. 12 is an enlarged section on line 12—12 of Fig. 5 showing how the trigger block is fastened to the chamber's left side;

Figs. 13 and 14 are enlarged sections on lines 13—13 and 14—14 of Fig. 5 showing the position of the trigger spring in the trigger block and other trigger mechanism details;

Fig. 15 is an enlarged section on line 15—15 of Fig. 5 showing the rectangular section of the trigger shank;

Fig. 16 is an enlarged section on line 16—16 of Fig. 3 showing the end fastening of the trigger block to the chamber;

Figs. 17 and 17A are enlarged rear views of the gun's trigger housing showing the position of the trigger sear before and after firing;

Fig. 18 is a section on line 18—18 of Fig. 17 showing the position of the cam surface of the sear before firing;

Fig. 18A is a section on line 18A—18A of Fig. 17A showing the same cam surface after firing;

Fig. 19 is an enlarged rear view of the breech actuating mechanism of Fig. 3 with portions cut away to show internal construction and with the parts in the "locked" handle position of Figs. 1-2-3-4;

Figs. 20 and 20A are sections on line 20—20 of Fig. 19 showing the gun's trigger before and after firing;

Figs. 21 and 21A are sections on line 21—21 of Fig. 19 showing how the trigger relates itself to the trigger locking key before and after firing;

Fig. 22 is a section on line 22—22 of Fig. 20 showing the relationship of the sear tongue to the trigger;

Figs. 23 and 23A are sections on line 23—23 of Fig. 19 showing the position of the trigger spring before and after firing;

Figs. 24 and 24A are sections on line 24—24 of Fig. 19 showing the position of the sear tongue before and after firing;

Fig. 25 is a section on line 25—25 of Fig. 19 showing how the hinge's left end is chamfered to facilitate entrance into the trigger block;

Figs. 26 and 26A are sections on line 26—26 of Fig. 19 showing the position of another portion of the sear before and after firing;

Fig. 27 is a section on line 27—27 of Fig. 19 showing the relationship of the sear and cocking cam plus cooperating parts;

Figs. 28 and 28A are sections on line 28—28 of Fig. 19 showing other relationships of the sear to the hinge housing before and after firing;

Figs. 29 and 29A are sections on line 29—29 of Fig. 19 showing the relationship of the sear to the hammer before and after firing;

Fig. 30 is a section on line 30—30 of Fig. 19 showing how the cartridge case extractor fits into a slot in the hinge's left portion;

Fig. 31 is a section on line 31—31 of Fig. 19 showing the relationship of the extractor, the cam plate and other parts;

Fig. 32 is a section on line 32—32 of Fig. 19 showing details of the hinge block and the handle stem;

Fig. 33 is a section on line 33—33 of Fig. 19 through the handle stem and the right end of the hinge;

Fig. 34 is a section on line 34—34 of Fig. 19 showing the right-end under-cut on the cam plate and how same permits breech block withdrawal only when the cam plate is properly positioned;

Figs. 35 and 35A are sections on line 35—35 of Fig. 19 showing the relationship of the cocking cam and hammer before and after firing;

Fig. 36 is a section on line 36—36 of Fig. 19 showing one of the cam rollers or pins by which the breech block is rotated by means of the coupling plate;

Fig. 37 is a section on line 37—37 of Fig. 19 through the same cam roller as viewed from a different angle;

Fig. 38 is a section on line 38—38 of Fig. 19 showing important internal constructions of the breech and firing mechanisms with parts in "before firing" position;

Fig. 38A is a section on the same line showing the sear of Fig. 38 as same appears when rotated to the "after firing" position;

Fig. 39 is a section on line 39—39 of Fig. 38 showing the pin which locks the hammer housing against rotation;

Fig. 40 is a section on line 40—40 of Fig. 38 showing the hammer housing pin which prevents rotation of the hammer;

Fig. 41 is a section on line 41—41 of Fig. 29A showing the relationship of the sear with the hammer in the fired position;

Fig. 42 is a plan view showing of the breech end of the gun with the operating handle rotated to an "intermediate" position wherein the breech block is unlocked from the chamber;

Fig. 43 is a rear elevation view of the gun with the named parts in the "intermediate" position of Fig. 42;

Fig. 44 is a section along line 44—44 of Fig. 43 showing the breech block and extractor as same appear when partially withdrawn from the chamber;

Fig. 45 is a view corresponding to Fig. 19 but differing therefrom in that the breech mechanism parts are shown in the breech block unlocked or "intermediate" handle position of Figs. 42 and 43;

Fig. 46 is a section on line 46—46 of Fig. 45 showing breech mechanism parts as same appear when the cam plate has been moved to the breech unlocked position by the operating handle;

Figs. 47, 48 and 49 are views taken on corresponding sections lines of Fig. 45 to indicate the position of the sear when the breech is unlocked;

Fig. 50 is a section on line 50—50 of Fig. 45 showing the relationship of the cocking cam, hammer and sear in the breech unlocked position;

Fig. 51 is a section on line 51—51 of Fig. 45 constituting a counterpart of Fig. 34 and showing the relation of the cam plate under-cut to the hinge block;

Fig. 51A is a corresponding section view which shows the cam plate interlocking the hinge block when the breech block is partially withdrawn from the chamber as in Fig. 44;

Fig. 52 is a plan view of the gun's breech end showing the breech block and associated mechanism in the "fully opened" position;

Fig. 53 is a rear elevation of the gun with the named parts in the same position as Fig. 52;

Fig. 54 is a right-side view of the gun breech end with the breech block and associated parts also fully withdrawn;

Fig. 55 is a section on line 55—55 of Fig. 52 showing how the operating handle is keyed to the dog by which the cam plate is operated;

Fig. 56 is a section on line 56—56 of Fig. 53 showing the gun's detent installed in a liner lug slot;

Fig. 57 is a section on line 57—57 of Fig. 53 showing the breech block and associated parts in the fully withdrawn position;

Fig. 57A shows the cartridge case head being moved past the detent by which same is held in the fully loaded position;

Fig. 58 is an enlarged view of the breech mechanism of Fig. 54 with portions cut away to show positioning of internal parts with the breech block and operating handle in the "fully withdrawn" position; and Fig. 59 is a section on line 59—59 of Fig. 58 constituting a further progression from Figs. 34 and 51 and showing the cam plate interlocking with the hinge block in the open breech position.

The complete recoilless gun

The inventive improvements hereof are illustratively disclosed as being incorporated in a military weapon 66—67 (see Fig. 1) of 105 mm. caliber capable of a completely recoilless firing of projectiles weighing up to 30 pounds at a muzzle velocity of 1250 feet per second. The gun's overall length is approximately 11 feet 2 inches and its total weight is slightly less than 350 pounds. It is designed for ready mobility and convenient transportation.

Satisfactorily it may be mounted either on a tripod structure (not shown) or on a "jeep" type military vehicle such as shown at 63 in Fig. 1. The illustrative gun support of that figure utilizes handwheels 64 and 65 for enabling the weapon accurately to be positioned both in azimuth and in elevation. When supported in the named or other equivalent manner the new gun may with complete safety to the user be fired with great accuracy and high military effectiveness.

As the description proceeds, it will become apparent that numerous other types of mounting for the new weapon likewise are usable with equivalent effectiveness; that the improvements incorporated into this weapon also may be applied to guns of characters, sizes, and shapes other than the one here disclosed; and that the represented 105 mm. open breech weapon thus has been chosen only to illustrate and not to limit the inherently wide application and scope by which these improvements are characterized.

The illustrative recoilless gun here shown comprises a barrel 66; an enlarged chamber 67 secured to the rear of this barrel and having the tapered shape represented; a removable liner 68 (see Figs. 8–9) secured in the rear of the chamber; a breech block 70 partially closing the rear opening of the liner; a hinge bar support 71 for the breech block; an operating handle 72 for that support; a trigger 73 (see Figs. 5, 20—20A) and housing 69 therefor for firing the weapon; and a sight 74 for aiming the gun in conventional manner.

This sight 74 may be of the "direct" telescopic type shown or of a "indirect" or other type capable of providing for all firings within the gun's range. It may be mounted on the gun's barrel in any manner suitable to make aiming convenient.

Once set up on its vehicular or other mounting, firing of the weapon is controlled by trigger 73 through a lanyard 75 (see Figs. 5 and 20) forwardly pulled by the user who places himself on the left side of the weapon ahead of the weapon's breech and in position to look through sight 74 in training the gun on its target.

Ammunition of the "perforated cartridge case" form shown at 77—78 in Fig. 8 is loaded into the weapon from the breech thereof in a manner presently to be explained. Such loading may be done either by the man who fires the weapon or by an assistant.

The gun's rifled barrel

As here shown, the gun's barrel 66 has an inside diameter of 105 millimeters. The bore of this barrel is rifled to secure the usual gains in accuracy and range which a spinning of the projectile in flight makes possible. The rifling represented has a right-hand twist and utilizes thirty-six lands 80 with intervening grooves 81 (see Fig. 8). Depending upon projectile stability needs, steepnesses of twist other than that illustrated may obviously be chosen; and twists in the left-hand direction may also be employed with equal effectiveness.

The gun's tapered chamber with reliner

As here shown, the gun's chamber 67 takes the form of an enlarged cylinder tapered at its forward end and there affixed to the rear of barrel 66 in any integrally secure manner as by the aid of screw threads 82 (see Fig. 8). The advantages flowing from this general form of chamber design are more fully set forth by co-pending Kroeger-Musser application Serial No. 577,830.

In order to prolong the weapon's useful life in the manner taught by co-pending Musser application Serial No. 628,647, the rear or breech end of gun chamber 67 is provided with a removable ring shaped "reliner" 68. Attachment of this reliner to the chamber interior is effected through threads 84 (see Fig. 8) which provide with the chamber a juncture of axial length sufficient to afford a gas-tight seal without gasketing. In the installed position shown, reliner 68 is prevented from turning with respect to chamber 67 by two sets of cap screws 76 and 79 which extend through the chamber wall into the reliner in the manner shown by Figs. 10 and 11. These cap screws further hold a hinge block 83 (later to be described) against the chamber's right side.

The breech block and chamber reliner orifice

As here shown the gun's breech block 70 is removably secured within the rear of chamber reliner 68 and constitutes only a partial closure therefor (see Figs. 3, 9, 43, 53). This member 70 takes the form of a cylindrical block which is radially spaced from the inner wall of reliner 68 in a manner to form a substantially annular orifice or venturi 85 that leads from the chamber's interior to the rear exterior of the gun. Figs. 3, 9, 43 and 53 show that this annular orifice is divided into four sections; and the same views plus Figs. 19, 45, 46, 54, 57, and 58 show that the breech block tapers inwardly from front to rear.

The outer rear contour of each of these four orifice sections 85 is defined by the removable reliner 68, as Figs. 3, 9 and other related views clearly show. Only the inner rear contour of each of these orifice sections is defined by the tapered breech block 70. A major portion of erosive wear is therefore received by the replaceable reliner (in the manner earlier disclosed by co-pending Musser application Ser. No. 628,647) leaving the breech block relatively free from harmful effect by the powder combustion gases which escape through orifice openings 85.

Four locking lugs shown at 86 in each of Figs. 3, 43, 45, 54 and 58 extend radially from the central body portion of breech block 70 (as taught by co-pending applications Ser. No. 536,590 and Ser. No. 577,830) and interfit with mating protrusions 87 (again see the figures just named) on the reliner wall interior (as taught by co-pending application Ser. No. 628,647). Each locking lug 86 carries threads on the periphery thereof, as best shown in Figs. 52–53–54, and each mating protrusion 87 is provided with similar threads indicated at 88 in Fig. 8. When these two sets of threads are engaged as in Figs. 3, 8 and 19 they securely lock the breech block 70 within the rear interior of chamber liner 68.

The chamber liner wall spaces which circumferentially separate the locking protrusions 87 have a diameter larger than the maximum for the breech block lugs 86, and this relation enables free longitudinal movement by these lugs through the spaces named. This movement is utilized in inserting the breech block within the chamber reliner and also in withdrawing the block therefrom, all in a manner presently to be described.

When inserted and locked within the chamber reliner 68, as shown in Figs. 3, 8 and 19, this breech block 70 constitutes a firm support for the ammunition which it helps to position within the weapon. The steel of its central core structure is of sufficient thickness and strength to withstand, with a factor of safety of well over two, the maximum rearward thrust exerted thereon during firing.

The complete round of ammunition

Cooperating with the barrel, chamber reliner and breech structure just described is ammunition having the special "perforated" cartridge case character shown in Figs. 8, 9 and 44 and earlier disclosed generally by Kroeger-Musser application Serial No. 536,590. As here illustrated, the complete round of this special ammunition includes a projectile 78 insertable into the rear bore of the barrel 66; a cartridge case 77 communicating (as by "crimping" or other releasable connection) with the rear of projectile 78 and firmly supported within the enlarged chamber 67 by the barrel at the forward end and by the chamber reliner 68 plus breech block 70 at the rear; a quantity of propellent powder 90 within the cartridge case; and powder igniting means shown in the form of a primer 91 and a booster 92.

As here represented, this cartridge case 77 has a diameter less than half that of the surrounding chamber 67's enlarged rear portion, and only slightly larger than the barrel's bore. The cartridge case wall preferably is of durable metal such as steel or brass, or of other material. A prerequisite for the case is that it be of sufficient thickness and strength to remain intact during firing.

Cartridge case perforations and lining

Perforating this wall metal in the manner taught by co-pending Kroeger-Musser applications Serial Nos. 536,590 and 577,830 are a large number of relatively small openings 93 distributed throughout substantially the entire length and circumference of the case in the uniform manner indicated by Fig. 8. These case wall openings 93 constitute an aggregate area which is nearly one-third of the total surface area of the represented cartridge case 77. This aggregate opening area is slightly more than eight times the bore area of the gun's barrel.

For preventing the propellent powder 90 from falling out of these openings during loading, and for acting as a diaphragm capable of withstanding adequate pressures before rupturing, a thin layer of frangible material 94, such as heavy paper, is placed inside the perforated case 77 between the case wall and the powder. Such a lining disintegrates early in the combustion cycle of the propellent powder and thus enables escape of combustion gases and burning powder radially through the openings and into the chamber space immediately surrounding the case.

The case construction here shown permits the named radial expansion of the powder gases without rupture of the metal between wall openings 93 or other damage to the case. Such security against failure of this kind safeguards the breech orifice 85 against blocking by gas, metal or other obstructions which would violently upset recoil neutralization and allow dangerously high pressures to build up.

*Propellent powder and igniting means*

The propellent powder represented at 90 substantially fills the entire volume of the cartridge case interior. For the 105 mm. ammunition shown this powder 90 may satisfactorily be either of a "single base" or a "double base" propellent type. A number of conventional powders have been found to exhibit satisfactory burning characteristics at the relatively moderate pressures employed by recoilless guns of the improved type here disclosed. Typically, such pressures for the particular weapon shown may be of the order of 10,000 pounds per square inch or less.

For igniting the charge 90 of this propellent powder, use may be made of any suitable primer such as is shown at 91—92 in Fig. 8. The percussion element 91 of this primer may be of a standard type and it serves to ignite a larger charge of booster explosive 95 in tube 92. Through the represented perforations in tube 92, combustion of the charge imparts very quick and effective ignition to the larger amount of propellent powder 90 in the cartridge case 77.

This primer structure is carried by the cartridge case head 97 in the central position shown by Fig. 8 where the attachment is rendered mechanically secure, as by force fitting. In this position the percussion element 91 is engageable by a firing pin 98 protrudable through the center of the breech block 70 as shown in Fig. 8 and other views. This pin 98 is actuated by firing mechanism later to be described.

*Pro-engraved projectile with indexing means*

The represented projectile 78 may consist either of a solid mass of metal or include an internal recess (not shown) for carrying a quantity of high explosive charge which may be detonated by suitable means such as a time or other fuze installed in the projectile's nose or base in well known manner. In either case the axial and transverse moments of inertia and the distance from the nose to the projectile's center of gravity will be so coordinated with the firing velocity and barrel rifling as to assure stability during flight.

This illustrated projectile 78 makes use of a rotating band shown at 100 in Fig. 8. That band is pre-engraved in the manner taught by co-pending Kroeger-Musser application Serial No. 536,590 to assure more ready passage of the projectile through the barrel 66's rifled bore. For the 105 mm. ammunition here described the band 100 may satisfactorily be made of brass or other metal about ¾ inch wide, and the pre-engraving thereof preferably is dimensioned to provide with the barrel's rifling a diametrical clearance of the close order of about 0.005 inch.

In order that the projectile during loading will automatically align its pre-engravings on band 100 with the barrel riflings 80—81, a forward bourrelet 101 thereof is equipped with one or more indexing detents 102 organized and installed in the manner taught by co-pending Musser application Serial No. 605,614. These detents 102 function in the manner fully explained by that earlier application to bring the engravings on projectile 78's rotating band 100 into accurate registry with the rifling of barrel 66 automatically upon forward thrust of the projectile into the barrel and without necessitating special rotative manipulations.

*Cartridge case positioning*

In the loaded position shown by Figs. 8–9 the ammunition's cartridge case 77 is supported centrally with respect to the walls of chamber 67 therearound. Such central positioning is effected by the rear chamber reliner 68 constituting the represented opening through which the projectile 78 and cartridge case 77 are inserted in loading the weapon. The breech block 70, moreover, has a mating recess which further receives the cartridge case head 97 during loading, and upon locking of the block in position (as shown in Figs. 8–9 and related views) abuts against the case head thereby restraining same against backward movement.

Similar central positioning of the forward end of the case is effected by protrusion of the extreme front section thereof (see Fig. 8) into the bore of barrel 66. Restraint of the case against longitudinal movement in the forward direction is effected by engagement of case head 97's rim with the rear inner edge of reliner 68. Such restraint assures that the primer 91 will be held in proper position for engagement by the gun's firing pin 98.

*The annular breech orifice and recoil neutralization*

The 105 mm. recoilless gun illustratively here shown effects recoil neutralization in the unique manner taught by co-pending Kroeger-Musser application Serial No. 536,590; that is, the forces of rearward reaction are neutralized by forwardly acting counterforces produced by rearward escape of generated powder gas through the earlier indicated annular orifice openings 85 (see Figs. 3, 9 and related views) between the gun's breech block 70 and the rear interior of chamber reliner 68 wherein this block is secured.

As is most clearly illustrated by Figs. 3, 43 and 53, this annular orifice extends all the way around the breech block's central core and is obstructed only by the four radial lugs 86 which engage with the four mating protrusions 87 of chamber reliner 68. All circumferential space between these lugs thus constitutes the named annular orifice 85 (see Fig. 9) which leads from the interior of chamber 67 rearwardly to the exterior of the gun.

Upon ignition of the propellent powder 90 within cartridge case 77 and the resultant forward discharge of projectile 78 out of barrel 66 there is expelled through the perforations 93 of case 77 combustion gases which are projected radially against the surrounding chamber wall and then rearwardly out of the chamber through the annular orifice 85 now being described. By thus acquiring momentum opposite to that of the forwardly moving projectile the explosive gases expelled in this way set up counterforces which neutralize recoil.

In the improved 105 mm. weapon here shown this momentum effect is supplemented by making the gun's annular breech orifice 85 oblong in a plane perpendicular to the gun's axis, and of "hourglass" shape parallel to the gun's axis (as shown in Fig. 9) to obtain the well known "venturi" action (as taught by co-pending Musser application Serial No. 628,647). Acceptable performance is found to be achieved when the dimensions of the "hourglass" orifice openings have the relative proportions shown in Figs. 3 and 9; however, dimensions other than those shown may be utilized with varying degrees of relative effectiveness.

Adjustment for zero recoil

Co-pending Kroeger-Musser application Serial No. 536,590 explains that for complete neutralization of recoil there exists an optimum ratio between the bore area of the gun's barrel 66 and the throat area of the breech orifice openings 85.

In the improved gun here illustratively disclosed this ratio for zero recoil is found to lie within the range of about 1.44 to about 1.47. The chamber reliner 68 is manufactured to specifications which include the predetermined optimum ratio for practically zero recoil, and it therefore needs no adjustments when installed in the gun. The gun's operation and performance follow principles more fully enunciated by co-pending Musser application Serial No. 628,647 by which use of this replaceable type of chamber reliner was first proposed.

In practice, one reliner 68 is found to withstand the firing of hundreds of ammunition rounds. The erosive wear thereon is so comparatively gradual as to make the variance in the small amount of recoil encountered during progressive wear to be scarcely noticeable to the user thereby making the gun easy to handle and control in combat firing.

Neutralization of rotational reaction

The principles regarding the neutralization of rotational reaction taught by co-pending Kroeger-Musser applications Serial Nos. 536,590 and 577,830 have again been adopted in the 105 mm. gun here disclosed. In this particular gun barrel 66's right-hand twist gives clockwise rotation (as viewed from the rear) to projectile 78 upon forward movement thereof through the barrel, and this right-hand acceleration of the projectile's mass imparts counterclockwise torque of equal magnitude to the barrel and chamber.

Such reactive torque is neutralized by causing the explosive gases which rearwardly discharge through the breech orifice openings 85 to impart to the weapon a counterbalancing torque of the same magnitude as that which the rifled barrel imparts to the projectile. This provision is effected by so specially shaping one pair of the orifice openings 85a that the gases passing through those openings have angular momentum imparted thereto.

Each of these two openings 85a has side walls that are slightly out of parallel with the gun's axis. This departure from true parallelism is clearly shown by Figs. 3, 43 and 53. Its effect is such that the powder gases flowing rearwardly through the two orifice openings 85a have imparted thereto a counterclockwise rotation (as viewed from the rear), these rearwardly moving gases being directed to the right at the lower portion of the breech and to the left at the breech's upper portion.

By reason of the counteracting spin about the gun's axis thus given to the gases there is imparted to the chamber 67 a torque counteracting that applied by the barrel to the projectile. Only a relatively small degree of angular twist is found sufficient to make the thus imparted torque of the same magnitude as barrel 66 imparts to projectile 78 in advancing it through the rifled bore. All neutralization torque thus set up by the escaping gases is exerted on the sides of the orifice openings 85a and through reliner 68 and chamber 67 is transmitted to the barrel 66.

Obviously, were the gun barrel to be rifled with left-hand twist, rotational reaction would be neutralized in exactly the same way merely by shaping the orifice openings 85a in the opposite sense. If desired, moreover, the necessary special shaping could be distributed among all four of the venturi openings 85.

Ballistic design and performance data

Design of the 105 mm. recoilless gun here shown is based upon principles of analysis and calculation which need not be discussed here in detail. It will suffice to say that appropriate design formula, analytical procedure, dimension calculations, and optimum design selection are employed and the gun made in the following manner: The projectile mass, muzzle velocity, caliber, barrel length and gun weight requirements are first specified. Then there is: (a) chosen for the firearm a breech nozzle of size and expansion ratio calculated to effect recoil balance; (b) selected a propellent powder with composition, burning constant and web thickness calculated to complete combustion about simultaneously with the projectile's leaving of the barrel; (c) assumed a series of flow factor values and calculated for each the powder charge, chamber volume, barrel length, internal pressure, and gun weight; and (d) selected for the firearm the flow factor whose calculated design values most closely match the specified requirements to be met.

The design thus calculated is experimentally verified by exhaustive proof firings, and such modifications as will improve the weapon's performance are then made. The resulting recoilless firearm is thoroughly practical and gives a firepower per unit weight which is far in excess of the best heretofore attainable.

The firing of hundreds of rounds of ammunition has confirmed beyond all doubt the successful and practical character of the heavy caliber recoilless firearm here disclosed. With the represented projectile 78 weighing 30 pounds, muzzle velocities of 1250 feet per second are consistently attained by the use of appropriately selected propellent charges.

Complete neutralization of recoil is uniformly achieved, and when firing the weapon from the vehicular mount shown in Fig. 1 or other convenient support users report a complete absence of weapon motion backward, rotative, sidewise or forward. Accuracies of an outstandingly high order also are achieved; these being realized at ranges up to and including 4½ miles.

Improved features of mechanical design

The 105 mm. recoilless weapon here shown is provided with a breech and firing mechanism which incorporates a number of significant and highly practical improvements. These combine to reduce the time and skill required to safely load and fire the weapon; they assure trouble-free operation under all service conditions including the most adverse; they impart "double safety" features to all critical part operations; they assure compactness plus simplicity of assembly and are so "fool-proof" as to make incorrect assembly impossible; and they accomplish the foregoing without sacrificing the advantages of light weight, minimum number of parts, ruggedness and simplicity of action.

The essential parts involved include the breech block 70 earlier mentioned; the operating handle 72 supported from the right rear of gun chamber 67 through hinge block 83; the trigger 73 supported from the left rear of chamber 67 inside trigger block 69; the hinge bar 71 through which a rearward movement of handle 72 effects withdrawal of breech block 70 from the chamber; a hammer housing 105 (see Figs. 8, 9, 29–29A, 35–35A, 38, 46, 50) which supports breech block 70 from hinge bar 71 in a manner permitting block rotation; a plate-like coupling ring 106 through which locking and unlocking rotations are transmitted to block 70; a cam plate 107 (see Figs. 19, 35–35A, 45, 58) which effects rotation of the breech block in response to movements of handle 72; the trigger housing 69 which receives the left end of hinge bar 71 when same is in the closed breech position of Figs. 1–2–3–4, 8–9, 19, 38, 42–43, 45–46–47–48–49; a firing pin hammer 108 (see Figs. 8, 29–29A, 35–35A, 38, 46, 50) carried within housing 105 and covered by a rear cap 109; and the trigger 73 (earlier mentioned) by which release of the hammer is controlled.

The breech block's hinge mounting

Explanation has already been given of how the breech block 70 is secured in the rear of chamber 67 by the aid of that block's locking lugs 86 and the mating protrusions 87 on the interior of reliner 68. In the "engaged" position represented by Figs. 1-2-3-4, 8-9, 19, 38, 42-43, this support is all that is needed to hold the breech block in place and it is fully adequate to restrain the maximum chamber pressures which combustion of the propellent charge 90 sets up.

To facilitate loading and removal of the cartridge case 77 after firing, provision is made for releasing this breech block 70 from its chamber reliner attachment, rearwardly withdrawing it from the chamber 67, and swinging it out of alignment with the chamber interior to the right-hand position shown by Figs. 44, 52–53–54, 58. The earlier mentioned hinge bar 71 comes into play during these actions.

The right end of this bar fits into hinge block 83 in the manner best shown by Figs. 2-3-4, 6, 10, 38, 52, 55. As earlier mentioned, the block 83 is securely bolted to the right rear of gun chamber 67. Aiding this attachment are cap screws 79 (see Fig. 11) earlier mentioned plus a companion pair of cap screws 112 at the block's front plus the third pair of cap screws 76 at the block's rear also extending through chamber 67 and into reliner 68 plus a fourth pair of cap screws 114 holding the hinge block's rear flange against the end of chamber 67 as shown in Figs. 3, 19, 43, 45, 53.

Contributing to this mounting is the lower end of handle 72 which projects downwardly through the hinge block 83 and engages with mating openings in upper and lower portions 71a of the hinge bar as best shown in Figs. 6 and 55. This juncture enables the bar 71 to hinge around the axis of handle shaft 72a from the fully closed position of Figs. 1-2-3-4 and related views progressively through the intermediate position of Figs. 44 and 51A and to the fully opened position of Figs. 52–53–54.

Once assembled as shown in Fig. 6 the handle shaft 72a is held in place by interfitting of cap screws 76 into the represented mating slots of the shaft. This holds the working parts in their proper place and at the same time facilitates disassembly and reassembly, as will later be explained.

Breech block rotation by handle movement

All rotations necessary to lock and unlock breech block 70 are imparted thereto by the gun's operating handle 72 through mechanism which will now be described. In the fully closed block position of Figs. 1-2-3-4 and related views the handle 72 is at its limit of forward travel; in the block unlocked position of Figs. 42–43 and 45 the handle 72 has been moved rearwardly to its intermediate position; and in the fully withdrawn block position of Figs. 52–53–54 and 57 the handle has been further moved rearwardly and to the right to its limit of rearward or opening travel.

For transmitting the named rotative movements from handle 72 to the block 70 use is made of the earlier mentioned cam plate 107 which is slidably housed in and surrounded on all sides except the front by the hinge bar 71; the coupling ring 106 which carries a pair of diametrically opposed pins 117 (see Figs. 19, 36–37, 45) extending at their forward ends into mating slots 118 (see Figs. 19 and 36) in the breech block and engaging at their rear ends with a pair of inclined slots 119 and 120 (see Figs. 19, 36, 45) in the forward face of the laterally movable cam plate 107; and a dog 121 (see Figs. 4, 6, 19, 38, 45–46, 58) which is keyed to handle shaft 72a at 122 (see Figs. 38, 46) and which carries on its rear side a pin 123 (see Figs. 19, 38, 45–46) which engages with mating slots 124 (see Figs. 38 and 46) in the extreme right end of cam plate 107.

Through this dog 121 and pin 123 rotative movements of the gun's operating handle 72 are translated into lengthwise movements on the part of cam plate 107. Thus, when handle 72 occupies the extreme forward position of Figs. 2-3-4, 19 and 38 the cam plate 107 is in its extreme left position in hinge bar housing 71; however, upon rearward movement of the handle to the intermediate position of Figs. 42–43 the cam plate 107 is pulled by dog pin 123 to the extreme right position shown by Figs 45–46. Return of handle 72 to the forward position of Figs. 1-2-3-4 pushes the cam plate 107 back to the extreme left position of Figs. 19 and 38.

In so moving endwise with respect to the hinge bar housing 71 the cam plate 107 imparts to breech block 70 the desired locking and unlocking rotative motions. As earlier indicated this conversion of endwise movement by cam plate 107 into rotative movement by breech block 70 is accomplished through the medium of cam plate slots 119—120, cooperating pins 117 that extend into the breech block, and coupling plate 106 that holds these pins in such a way as to absorb all lateral thrust exerted on the pins and impart only rotative motion to the breech block.

The locked or fully closed position of breech block 70 is effected when the cam plate is in its extreme left position as shown by Fig. 19. Movement of the cam plate to the extreme right position of Figs. 42 and 45 causes pins 117 to slide in slots 119—120 in such a way as to rotate the breech block counterclockwise to the unlocked position of Fig. 43. Return of the cam plate to the extreme left position of Fig. 1 rotates the breech block clockwise back to the locked position of Figs. 3 and 19.

By reason of the coupling ring 106 absorbing all side thrust and by further reason of the pins 117 carried by this plate extending into the oblong openings 118 in the breech block, that block is kept free to occupy the central position so essential for free rotation and easy action of the gun parts.

It will be noted that whereas cam plate slot 119 is straight the companion slot 120 is curved. This curvature is made necessary by the arc through which breech block pins 117 travel during the rotative actions named. The curvature could, of course, be equally divided between slots 119 and 120, but for reasons later to be made evident it is preferred to keep slot 119 straight and allot all of the required curvature to slot 120. Without this curvature binding or jamming of the parts would result to such an extreme degree as to make desired operation impossible.

Hinge opening and closing by handle movement

To swing the hinge bar 71 and associated parts outwardly from the closed position of Figs. 2–3, 8–9 etc., to the open position of Figs. 44, 52–53–54, 57 and 58 it is necessary only to swing handle 72 from the intermediate position of Figs. 42–43 to the extreme limit of opening travel shown by Figs. 52–53–54. Opening of the hinge structure starts only after handle 72 has been pulled backwardly beyond the intermediate position of Fig. 42. In that intermediate handle position the hinge structure parts are as shown by Figs. 45–46.

Under this condition a rodlike sear 126 (see Figs. 19, 38, 45–46, 58) has been withdrawn from mating engagement by its left end with trigger 73, as shown in Figs. 45–46; the cam plate 107 (which effects sear withdrawal) has been moved by dog 121 and pin 123 to the extreme right-hand position shown by Figs. 45–46; and a flat portion of the dog has now been rotated into abutting contact with cam plate 107 as indicated at 127 in Fig. 46. As earlier explained, the breech block 70 occupies the "unlocked" rotative position of Fig. 43 and in all respects the hinge structure is now completely free for withdrawal from the gun chamber 67.

Such withdrawal is effected by further rearward movement of handle 72 from the intermediate position of Fig. 42 to the extreme open chamber position of Figs. 52–53–

54. By reason of the contact 127 between dog 121 and cam plate 107 which Figs. 46 and 57 indicate, further counterclockwise rotation of that dog is directly transmitted to hinge structure 71. Hence the further backward handle movement just named swings the hinge structure around the axis of the lower portion of handle 72.

This swinging first withdraws the left end of hinge bar 71 from the trigger housing 69 (see Fig. 48) and thus progressively moves the hinge bar through the partially open position of Fig. 44 to the fully open position of Figs. 52–53–54. Upon arrival at this fully open position further movement of both handle 72 and hinge bar 71 is arrested by contact of the right end of that bar with the hinge block 83 as indicated at 128 in Fig. 59.

The hinge bar 71, breech block 70 and other associated parts are now fully withdrawn from the gun chamber 67 as shown by Figs. 52–53–54, 57–58. Insertion of an ammunition round 77–78 into the gun chamber or withdrawal of a fired cartridge case 77 from that chamber now becomes possible. In this fully open position, moreover, the rounded exterior of hinge block 83 is accommodated by the recesses 129 in the extreme right end of cam plate 107 as shown in Figs. 51A and 59.

The progressive steps by which this mating is accomplished are shown by Figs. 51–51A and 59. Figs. 51 and 31 show how upper and lower portions of the cam plate 107 are cut away through a circular contour 129 which accurately matches the radius of hinge block 83's curved exterior. As the hinge bar 71 is rotated by handle 72 from the closed-breech position of Fig. 51 to the partially open position of Fig. 51A each cut away portion 129 of cam plate 107 swings around the outside of hinge block 83 as shown by Fig. 51A. As the hinge opening movement continues, the parts finally take the positions shown by Fig. 59.

In order to close the hinge structure it is now only necessary to return handle 72 from its fully open position of Figs. 52–53–54 back to its intermediate position of Figs. 42–43. Such operation of the handle rotates dog 121 clockwise thereby causing pin 123 to exert on slot 124 in cam plate 107 a force tending to push the cam plate toward the left end of hinge bar 71. By reason, however, of the mating engagement of cam plate 107 with the rounded exterior of hinge block 83 movement of the plate cam in hinge bar 71 is rendered impossible, and instead the force exerted by dog pin 123 (see Fig. 46) is converted into a torque exerted on the entire hinge structure in a way that rotates same around the axis of the lower portion of handle 72.

This rotation is clockwise and it progressively advances the hinge structure from the fully open position of Figs. 52–53–54 to the partially open position of Figs. 44 and 51A and finally to the closed hinge position of Figs. 45–46 and 51. In this closed hinge position the left end of hinge bar 71 has re-engaged with the trigger housing 69 as shown in Figs. 2–3–4, 48 and other related views. To facilitate such re-engagement the forward edges of the hinge bar ends are chamfered as shown at 130 in Fig. 48. Such chamfering assures self-alignment of the hinge bar end in entering the mating opening in the hinge block 69 that is affixed to gun chamber 67's left side.

With the hinge bar 71 closed as aforesaid the breech block 70 continues to occupy the unlocked rotative position of Figs. 43 and 45; the cut away portion 129 of plate cam 107 has disengaged itself from the circular exterior of hinge block 83 as shown in Fig. 51; and the cam plate 107 and cooperating parts are now again occupying the positions indicated by Figs. 45–46. Under these conditions handle 72 occupies the intermediate position represented by Figs. 42–43.

As handle 72 is further advanced to its extreme limit of forward travel as shown by Figs. 2–3–4, the following actions take place: Cam plate 107 is by dog 121 and pin 123 moved from the extreme right position of Figs. 45–46 to the extreme left position of Figs. 19 and 38. In consequence of this movement cam plate slots 119 and 120 rotate breech block 70 clockwise causing the four peripheral locking lugs 86 to move into mating engagement with the chamber liner protrusions 87 and thereby secure the breech block in the rear of gun chamber 67 as shown by Figs. 3, 19 and 38.

In addition the rodlike sear 126 is moved by cam plate 107 lengthwise to the left from the trigger-disengaged position of Figs. 45–46 to the trigger-engaged position of Figs. 19 and 38. The details of this latter action are more fully described by a later section of this specification. It will here suffice to say that when the left end of sear 126 is so fitted into a mating slot in the gun's trigger 73 there is established a rotative connection whereby operation of the trigger effects a firing of the gun through the rodlike sear just mentioned.

*The firing hammer and cocking parts*

It has already been seen that the gun's firing pin 98 is provided with a hammer 108 which is directly attached to and extends rearwardly from the pin in axial coincidence therewith as shown by Figs. 8, 29–29A, 35–35A, 38, 57. These views show that the pin and hammer are surrounded by hammer housing 105 which extends through the center of breech block 70, the coupling plate 106 and an elongated opening through the cam plate 107. This latter opening is most clearly shown in Figs. 19, 45 and 58. It permits the cam plate 107 to move lengthwise in its enclosing hinge bar 71 without interference from the hammer housing 105 that extends therethrough.

Support for this hammer housing 105 is provided by the rear wall of hinge bar 71 in the manner best shown by Fig. 57. A shoulder about midway of the housing tube mates with the stepped-down opening in hinge bar 71 and is there held in snug engagement by the hammer housing cap 109 which is screwed on to the rear portion of the housing 105. The forward portion of this cap abuts the rear of hinge bar 71 so that tightening down of the cap firmly supports the hammer housing 105 from the hinge bar in the manner shown.

To restrain the hammer housing 105 from rotation during such tightening, use is made of a pin 110 which extends upwardly through the lower portion of hinge bar 71 as shown in Fig. 39 and into the housing wall as indicated by Figs. 38 and 39. Dimensioning of the parts is such that both the breech block 70 and the coupling ring 106 are free to rotate on the hammer housing while the cam plate 107 is free to slide with respect thereto.

The firing pin hammer 108 carried within the housing's central bore has the represented cylindrical shape and is dimensioned to allow free sliding movement of the hammer and firing pin lengthwise through that bore. In order to prevent rotation of the hammer during such axial movement use is made of a pin 132 projected through the right side of the hammer housing 105 as shown by Figs. 35–35A, 38 and 57 to ride in the mating slot 133 which extends lengthwise of the hammer 108 as best shown by Figs. 38 and 41. This rotation-preventing pin 132 has a utility presently to be made evident.

Immediately behind the hammer 108 is a hammer spring shown at 134 by Figs. 8, 29, 29A, 35, 35A, 38, 57. This spring takes the form of a coil which is compressed between the inner rear of housing cap 109 and the rear of hammer 108 in the manner shown. By this spring the hammer is constantly urged forwardly with sufficient force to accomplish a firing of the weapon in positive and reliable manner.

Cocking of the hammer is effected upon each left-to-right movement of cam plate 107 through the medium of a cocking cam 135 carried by the cam plate in the manner shown by Figs. 35–35A, 38, 41, 45, 57, 58. The left end of this cocking cam engages with a mating opening in cam plate 107 in the manner clearly shown by the drawing views just named. This engagement assures that all lengthwise movements by the cam plate 107 are directly transmitted to the cocking cam 135.

The right portion of this cocking cam extends into a hammer housing opening 144 (see Fig. 41) and carries the taper best represented by Figs. 35–35A, 46 and 47. Figs. 19, 41, 45 and 58 show that this cocking cam rides on the upper side of hammer 108; while Figs. 29, 35–35A and 57 indicate how the upper portion of this hammer is cut away to receive the cocking cam 135 and how the shoulder 136 at the rear of this cut away portion is provided to convert left-to-right motion of the cocking cam into rearward movement by the hammer 108.

Starting with the cocking cam 135 in the extreme left position of Figs. 35–35A lengthwise movement thereof to the extreme right position of Fig. 57 pushes the hammer back against spring 134 from the released position of Fig. 29A to the cocked position of Figs. 29 and 57. Such cocking is effected whenever cam plate 107 is moved from left to right incident to an opening of the gun hinge structure.

As long as the cocking cam 135 remains in the right position of Fig. 57 the hammer 108 is by it directly held in its rearward position of that figure. Upon return of the cocking cam 135 to the left position of Figs. 35–35A the hammer will then further be held cocked by the earlier mentioned sear 126 until such subsequent time as rotation of the sear by means of trigger 73 releases the hammer for firing the weapon.

The trigger and hammer releasing sear

It has already been seen from Figs. 5, 19 and 38 that the gun's firing trigger 73 is supported by trigger housing 69 attached to the left side of the gun's chamber 67. This attachment is effected by a first pair of cap screws 115 extending into the chamber's side as shown by Figs. 5, 12, 20–20A plus a second pair of cap screws 116 projecting into the rear face of the chamber wall as shown by Figs. 3, 17, 19, 43 and 53. Other equivalent attaching means are of course useable.

The firing trigger 73 is provided on its right side with a circular shank which rotatably fits into a mating opening or bore in the trigger housing 69 as best shown in Figs. 13, 19, and 38. The arm portion of the trigger to which lanyard 75 is attached (see Figs. 5 and 20) is continually urged to the rear position of Figs. 5 and 20 by means of a trigger spring shown at 137 in Figs. 13 and 23. This spring takes the form of a coil, one end of which passes through a slot 141 in the right end of the trigger shank as shown in Figs. 22 and 23 while the other spring end fits into a mating hole in the housing member 69 as shown at 137 in Figs. 24–24A, 45 and 47.

During installation, this trigger spring 137 is wound up sufficiently to exert on the trigger shank a torque which continuously urges the trigger arm into the rear position of Figs. 5 and 20. To hold the trigger shank from sliding to the left out of the housing opening, use is made of a half-moon key shown at 138 in Figs. 21–21A. This key is carried by a slot in the trigger housing 69 and it projects into a mating slot 139 in the trigger shank. Once assembled in the manner represented the trigger is free to turn through the angular distance typified by Figs. 20–20A while being restrained by key 138 against axial withdrawal from the trigger housing 69.

Rotative movements by trigger 73 are transmitted to the sear 126. As will be seen presently, all actuations of the sear are positive and none of them depend on spring action. The named rotative transmission is through the medium of the slot-to-tongue connection represented in Figs. 19, 22 and 38. From these and related views it will be seen that the left end of sear 126 is provided with a tongue 140 which mates with and fits into the earlier mentioned slot 141 in the right end of trigger 73's circular shank.

As earlier indicated, this connection is, however, established only when the hinge bar 71 is fully closed and when the cam plate 107 housed by that bar is moved fully to the left as in the views of Figs. 19 and 38. When the cam plate 107 occupies the right position of Fig. 45, sear 126 is moved sufficiently to the right to withdraw the sear tongue 140 from the trigger slot 141. This action will be described more fully presently.

The right end of sear 126 is rotatably and slidably supported by an opening through hammer housing 105 which passes immediately beneath the hammer 108 as indicated by Figs. 19, 29–29A, 41, 45 and 58. The forward lower portion of hammer 108 is cut away as best shown in Figs. 29–29A to accommodate the full diameter of sear 126; the rear lower portion of the hammer is, however, not so cut away in order that at proper times the sear may serve to hold the hammer cocked as shown in Fig. 29.

It will be seen from Figs. 19, 29–29A and 41 that there is made in the upper face of the sear a cut 142 which aligns with hammer 108 when the sear is in the left position of Fig. 19, and which allows the rear portion of the hammer to advance past the sear when and only when the bottom of the cut is rotated to the horizontal as shown by Fig. 29A. This rotation occurs only when trigger 73 is pulled forward from the position of Fig. 20 to the firing position of Fig. 20A. At all other times the sear 126 has the rotative position shown by Fig. 29 wherein forward movement of hammer 108 is effectively blocked.

In order that the sear will be moved lengthwise by cam plate 107 in the manner earlier stated, an intermediate portion thereof is further provided with an enlarged shank shown at 143 by Figs. 18–18A, 19, 38 and 45. Figs. 18–18A show how two sides of this enlarged shank are flattened to permit rotative movement of the sear through and only through the angle traversed by trigger 73 in moving between the rear and front positions of Figs. 20 and 20A. Such restriction of sear rotation contributes to the ease and reliability with which the sear can be assembled into the gun's hinge mounted firing and related mechanism.

With the sear 126 fully to the left as shown by Figs. 19 and 38 movement of cam plate 107 to the right (see Fig. 45) brings the left extremity of the cam plate's central opening around hammer housing 105 into contact with sear shank 143 and thereby causes the sear also to move to the right during the final portion of cam plate travel. At the end of that travel sear 126 accordingly occupies the position of Fig. 45 wherein the left end of the sear has been fully withdrawn from the mating slot 141 in the shank of trigger 73. Under this condition the hammer cut 142 in the sear's right end has been so moved out of alignment with the hammer that forward movement of the hammer past the sear is impossible regardless of what rotative position the sear occupies. This is very clearly illustrated by Fig. 50 (taken on line 50—50 of Fig. 45).

From earlier given description it has been seen that the left-to-right movement of cam plate 107 causes cocking cam 135 to move hammer 108 from the forward position of Figs. 29A and 35A to the cocked position of Figs. 29, 35, 46 and 57. Hence each opening of the hinge structure by handle 72 always brings the hammer 108 to the cocked position and allows sear 126 to block same against forward movement as just described.

Trigger spring 137 in keeping trigger 73 to the rear (Fig. 20) also assures that the sear 126 occupies the position of Figs. 28 and 29 at the start of its withdrawal to the right from trigger 73. Under these conditions no rotation of the sear takes place during such withdrawal and the sear accordingly has the same rotative position at the end thereof.

As a further safeguard in this respect provision is made to assure that even though the sear should leave the trigger when the latter is in the forward position of Fig. 20A (as might be the case were the trigger spring 137 to break) the lengthwise movement of the sear will be accompanied by a rotation which brings the sear into a final rotative position corresponding to the cocked trigger condition of Fig. 20. This provision includes a helical cut 145 plus a flat shaping 146 carried by the sear's enlarged left end as shown by Figs. 19, 38, 45, 57 and 58.

This cut and flat cooperate with the rear inner surface of hinge bar 71 in a way which positively guarantees that each lengthwise movement of sear 126 to the right will always end with the sear occupying the rotative position which Fig. 29 shows. An understanding of how this takes place will be aided by reference to Figs. 17–17A in supplement to Figs. 38 and 46. Fig. 38A shows the left end of sear 126 as rotated when trigger 73 has the after-fired position of Fig. 20A.

As the sear is pulled lengthwise to the right in this rotative position the helical cut 145 so contacts the right edge of the sear accommodating opening in the inner rear face of hinge bar 71 that further movement of the sear to the right sets up on the sear a torque which progressively turns it to the rotative position corresponding to the "before-firing" trigger condition of Fig. 20.

The action here is of a wedging type readily apparent upon examination of Figs. 38, 46 and other related representations. This action brings the sear flat 146 into mating contact with the inner rear surface of hinge bar 71 as shown in Figs. 46, 49 and 57. By such contact the sear 126 is positively held in the rotative position of Fig. 29 as long as the sear occupies the extreme right position of Figs. 45, 46, 57–58.

The action of the so rotatably held sear 126 in returning from the trigger withdrawn or right position of Figs. 45–46 to the trigger engaged or left position of Figs. 19 and 38 will now be considered. Such return is produced by the right-to-left movement of cam plate 107 that accompanies movement of operating handle 72 from the intermediate position of Fig. 42 to the extreme forward position of Figs. 2–3–4.

As cam plate 107 approaches its left limit of travel (shown by Fig. 19) the right end of sear 126 is contacted by the right extremity of the cam plate's central opening that surrounds hammer housing 105. During the remainder of the cam plate movement to the left sear 126 also is carried along so that sear tongue 140 is pushed into slot 141 in the shank of trigger 73. The earlier stated rotative positioning of sear 126 assures that these parts will be properly aligned as always to permit this engagement. The foregoing assumes, of course, that trigger spring 137 is holding the trigger 73 in the rear position of Fig. 20.

Under these conditions the hammer cut 142 in the right end of sear 126 is again brought into alignment with the hammer 108 immediately thereabove, which hammer has previously been cocked by cocking cam 135 as earlier described. Sear 126 now being in the "before firing" rotative position of Fig. 29, the hammer 108 continues to be held in the cocked position by the sear as Fig. 29 indicates. The cocking cam 135 has meanwhile returned to the extreme left position of Fig. 35 thus freeing the hammer for forward firing movement upon rotation by trigger 73 of sear 126 to the "firing" position of Figs. 20A and 29A.

*The cartridge case extractor*

A new and improved cartridge case extractor also has been incorporated in the recoilless gun here disclosed. This extractor is shown at 147 in each of Figs. 19, 38, 44, 45, 46, 57 and 58. It comprises the represented T-shaped member 147 carrying on the stem end thereof a hook 148 which at proper times engages with the rim 97 of cartridge case 77 as shown in Fig. 44, whereby opening of the hinge structure following each firing effects a positive withdrawal of the cartridge case from the gun chamber 67.

The base of this extractor 147 is carried in a slot 149 (see Fig. 57) in the inner face of hinge bar 71. An internal spring 150 (see Figs. 38 and 57) of the compression type urges a plug 151 (again see Figs. 38 and 57) against the base of this slot 149 and thereby exerts upon the extractor a force tending to bias it from the inactive position of Figs. 38 and 46 to the active position of Figs. 44 and 57. A recess 162 (see Figs. 11, 38, 44, 46, 57–57A) in the chamber liner 68 accommodates this extractor when the breech hinge structure is closed.

From Figs. 19, 38 and 58 it will be seen that the cam plate 107 is provided with a longitudinal slot which permits axial movement of the cam plate without direct interference with the extractor. Fig. 38 further shows, however, how the right portion of cam plate 107 holds the right toe of the extractor firmly against the hinge bar 71 when the cam plate occupies the extreme left position of Figs. 19 and 38.

When, however, the cam plate is moved to the extreme right position of Figs. 45–46 an angular groove portion 152 of the cam plate body (see also Fig. 38) moves over the left toe of the extractor 147 while the right end of the cam plate completely clears the right extractor toe as shown in Figs. 46 and 57. In the former condition the extractor 147 is held inactive with the hook portion 148 thereof away from the periphery of cartridge case rim 97; in the latter condition freeing of the extractor's right toe allows spring 150 to urge the member about the left toe as a fulcrum and thereby bring the extractor hook 148 into contact with the cartridge case rim 97 as shown in Fig. 44.

Under this condition withdrawal from the gun chamber of the breech block 70 and other hinge-carried parts causes the extractor hook to pull the cartridge case out of the gun in the general manner indicated by Fig. 44. This withdrawal is both positive and reliable. At all times when the extractor is not needed, however, the action thereon by cam plate 107, which Fig. 38 illustrates, positively assures that the extractor will be held completely out of the way.

A further function of the extractor 147 when in the tilted position of Fig. 57 is to aid in blocking cam plate 107 against movement out of the extreme right position shown by that figure. Such blocking is effected by the right extractor toe in the manner indicated, and it supplements the cam plate-to-hinge block engagement of Figs. 51A and 59 in coupling the hinge bar 71 directly to handle 72 during hinge closing movement by that handle.

*The detent case holder*

In loading weapons of the heavy caliber type exemplified by the gun 66—67 here shown, it frequently is desirable to hold the weapon at a selected firing elevation continuously between firings. One such elevation is indicated generally by Fig. 1. Ammunition rounds such as are shown at 77—78 in Fig. 8 typically are heavy and when thrust into a so elevated gun they have a tendency to slide back out of the gun chamber before the breech block 70 can be closed and the weapon otherwise fully conditioned for firing.

In conventional artillery pieces (not here shown) the projectile rotating bands are non-preengraved and to counteract the named tendency the rear of the rifled barrel's bore is outwardly flared to constitute a "forcing cone" (not here shown) into which the projectile band is wedged by the forward loading thrust sufficiently to prevent rearward sliding of the round prior to breech block closure. However, with pre-engraved ammunition of the type represented at 77—78, this "forcing cone" expedient cannot be availed of and a loading problem is therefore presented by the weapon here disclosed.

In order to solve this loading problem the improved gun here shown is still further provided with a detent which restrains the inserted cartridge case from sliding back out of the weapon until such time as final withdrawal of the fired case arrives. This detent is shown at 154 in Figs. 38, 44, 46, 56, 57.

In the improved form shown the main detent member 154 is rotatably mounted on a fulcrum 155 having end tongues 156 insertable into the slots 157 made in opposite sides of the detent accommodating opening 162 which Fig. 56 shows to have been cut in the chamber locking protrusion 87 there represented. This opening 162, it will be seen, accommodates not only the detent 154 but also the case extractor 147 when the breech block carrying hinge bar 71 occupies the closed position of Figs. 38 and 46.

By means of an internal spring shown at 158 in Figs. 38 and 57 the free or forward end of the detent 154 is urged toward the cartridge case rim. This urging results from a force couple set up by the compression spring 158 through pin 159 which the spring forces against one side of the represented V slot 160 in the fulcrum 155. As earlier indicated, the fulcrum is prevented from rotating by the engagement of its end tongues 156 with the slots 157 in the side walls of the detent accommodating groove.

The action of the complete detent mechanism in loading the gun is best illustrated by Figs. 57 and 57A. With the breech block 70 and hinge structure 71 fully withdrawn from the gun chamber the detent 154 moves to the position of Fig. 57. As the cartridge case 77 is inserted into the chamber the case rim 97 pushes the detent back slightly as shown by Fig. 57A. After the case rim passes the contacted detent agent, the spring action earlier named restores the detent to the position of Fig. 57 where it blocks the cartridge case from sliding back out of the gun chamber.

As the hinge bar 71 with supported parts is now closed by the before explained operation of handle 72, the extractor 147 approaches the detent in the manner shown by Fig. 44. Further hinge closing movement brings the extractor into contact with the inner face of the detent and progressively pushes the detent to the inactive position shown by Figs. 38 and 46. The breech block 70 has meanwhile been brought into abutment with the cartridge case head and the ammunition round is now prevented by the breech block from sliding out of the gun.

The detent construction here disclosed not only accomplishes its intended purpose in a reliable and satisfactory manner but it also offers significant advantages in the way of simplicity plus ease of assembly and disassembly. The entire detent assemblage can be fully withdrawn from the gun by moving the fulcrum 155 to the left in Fig. 57A and completely out of tongue slots 157. Restoration of the assemblage to the operative position shown is equally simple. Moreover, the individual parts of the assemblage are easily taken apart and put together.

Once the case detent assemblage is withdrawn from the gun, all component parts may readily be disassembled without the aid of tools. The mounting fulcrum 155 is first rotated so that the V-slot 160 therein is completely out of register with the pin and spring bore. This rides the pin end on the fulcrum's unslotted circumference and first frees the fulcrum for sidewise withdrawal from the detent body 154 and then frees the pin and spring for lengthwise withdrawal from the detent body recess.

Re-assemblage is equally simple, and it also requires no tools. The spring 158 and pin 159 are first placed in the detent recess (see Fig. 57); one of the end tongues 156 (see Fig. 57A) of fulcrum 155 is inserted beneath the end pin 159 and rotated to compress spring 158 and ride the pin end on the tongue side (fulcrum's full circumference); and with the parts so placed the fulcrum is thrust endwise into and centered with respect to the detent body. Fulcrum slot 160 is next so rotatively related to the pin end that following reinsertion of the fulcrum tongues into the detent mounting slots 157, operation in the intended manner of Fig. 57 is at once made available.

It will be noted that springs 158 and 150 of the detent 154 and of the extractor 147 (see Figs. 38 and 57) are identical in size and design, and further that the detent and extractor pins 159 and 151 also are identical. Interchangeability of these parts thus is provided. Hence, should extractor spring 150 break or either it or extractor pin 151 become lost, replacement by the corresponding parts borrowed from the detent 154 immediately becomes possible. This effectively assures that the extractor need not remain out of commission due to spring breakage.

Moreover, the novel extractor and detent organization here shown offers a further unique advantage. Backing the extractor 147 as it does (see Figs. 38, 44, 46, 57), the detent 154 transfers its spring pressure to the extractor through the direct contact represented. This pressure is in the same direction as that which the extractor spring 150 exerts. Hence should spring 150 fail the necessary biasing of the extractor may be provided by the detent spring 158 without transfer, as just stated.

*Operation of the complete weapon*

From the foregoing it will be seen that there has been provided an improved recoilless gun which offers important advantages in connection with both loading and firing. To place the ammunition round 77—78 (see Fig. 8) within the weapon it is merely necessary to pull operating handle 72 to its extreme rear position thereby unlocking breech block 70, withdrawing it from chamber 67 and further swinging it completely free of the chamber opening as shown in Figs. 52–53–54.

The ammunition round 77—78 is now inserted into the opened chamber and the rear of the barrel's bore as shown in Fig. 8. As the projectile enters the barrel, indexer detents 102 serve to bring the lands on the pre-engraved band 100 into alignment with the grooves of the barrel bore and forward thrust is then continued until the rim of the cartridge case head 97 abuts with the mating shoulder on chamber liner 68 as shown in Figs. 8–9. Case detent 154 now holds the ammunition round in this position as indicated by Fig. 57.

The breech block 70 is now moved to the closed position by swinging handle 72 to its extreme forward position wherein locking of the breech block 70 in the chamber takes place and other actions earlier described in detail also are performed. In approaching and engaging with the cartridge case head 97 the flared recess in the breech block's front comes into abutment with the head and thereby directly restrains the case against rearward movement.

The firing pin hammer 108 now has the "cocked" condition shown by Figs. 29 and 35 and the weapon is accordingly ready for firing. Forward pulling of trigger 73 by lanyard 75 will release the hammer 108 and firing pin 98 to cause detonation of percussion element 91 and ignition of primer and propellant charges 95 and 90.

The resultant combustion of propellant 90 pushes the projectile 78 forwardly through barrel 66 and at the same time ruptures the perforated cartridge case's frangible lining 94 and produces radial expulsion of explosive gases into the chamber 67. This expulsion starts early in the burning cycle and is accompanied by continued combustion of the powder. The resultant pressure within the chamber produces escape of the explosive gases through the annular breech orifice 85 and thence to the rear of the weapon. As already explained, this escape of explosive gases sets up counterforces which completely neutralize recoil and thus permit the weapon to be fired from a relatively light mounting as shown in Fig. 1.

The perforated wall metal of cartridge case 77 remains intact during this firing and is not ruptured or otherwise damaged. Since expulsion of explosive gases from all of the case perforations 93 is simultaneous, the represented tapered design of chamber 67 is in practical use found to be fully effective for diversion of the gases to the rear.

Subsequent withdrawal of the fired cartridge case from the chamber is effected by merely swinging handle 72 to the extreme rear position of Figs. 52–53–54. This unlocks the breech block 70 and in withdrawing same as shown by Fig. 44 causes extractor 147 to pull the fired case 77 sufficiently out of the chamber to make full manual removal easily possible.

Safety features and tamper-proof construction

From the foregoing it will be seen that the improved breech and firing mechanism here disclosed is relatively tamper proof and that it offers numerous safety features which are exceedingly desirable. This comes about from the fact that all actions in the mechanism are so interlocked and correlated as effectively to prevent any of them from taking place prematurely. These features of safety have already been described in a general way but because of their importance still further attention will now be directed thereto.

The improved construction hereof renders the gun unfirable until the breech block has been fully closed and locked following each insertion of a live ammunition round 77—78 into the gun chamber. Once the hammer 108 is cocked incident to swinging the breech block carrying hinge bar 71 to the open position of Figs. 52-53-54, premature release thereof is blocked by cocking cam 135 in the position of Fig. 57 and further by sear 126 in the position of Fig. 45. This double blocking continues until the hinge bar 71 is again moved by handle 72 through the closed position of Figs. 45-46 to the fully locked breech block condition of Figs. 2-3-4, 19 and 38.

Then and only then does it become possible to fire the weapon by pulling trigger 73 forward to the position of Fig. 20A. When the hinge bar 71 initially reaches the closed position of Figs. 45-46 the rotative connection between trigger 73 and sear 126 still has not been established; before this connection is established by the subsequent right-to-left movement of cam plate 107 breech 70 must have its locking lugs 86 rotated clockwise into engagement with mating protrusions 87 on the chamber liner interior. This engagement, furthermore, must be substantially completed before sear 126 is moved by cam plate 107 sufficiently to the left to bring the sear cut 142 into alignment with the hammer 108 immediately thereabove.

Meanwhile the sear flat 146 continues in engagement with the inner rear surface of hinge bar 71 and thereby keeps the sear rotated to the cocked position of Fig. 29 until substantially full shift of the sear to the extreme left or trigger-coupled position has been attained. Prior to this attainment exertion of forward force on trigger 73 is totally ineffective for releasing the hammer and firing the weapon.

Should, moreover, the trigger 75 be positioned as in Fig. 20A instead of as in Fig. 20 (due to breaking of trigger spring 137 or for other reason) the tongue 140 on the left end of sear 126 cannot gain entry into trigger slot 141 as the sear is urged from right to left. This inability of the sear to couple with the trigger under the condition named constitutes a further safeguard in that the gun operator is warned, by inability of the operating handle 72 to advance completely into the extreme forward or breech-locked position, that all mechanism parts are not in operative condition.

Further safeguards of analogous benefit are incorporated in the unique constructions here shown for the cartridge case extractor 147 and the case loading detent 154. It has already been seen how the extractor is by cam plate 107 (see Fig. 38) positively held in the inactive position as long as the cam plate occupies the extreme left position of Figs. 19 and 38; and also how shifting of the cam plate 107 to the extreme right position of Figs. 45-46 and 57 renders the extractor 147 effective for engagement with the cartridge case rim 97 as shown in Fig. 44.

It has further become apparent how extractor 147 functions in holding the case loading detent 154 in the inactive position of Fig. 46 at all times except when the hinge carried breech block 70 is withdrawn from the gun chamber as in Figs. 44, 52-53-54 and 57. This unique coordination contributes to the fool-proof manner in which the extractor and the detent perform their intended functions with the highest of reliability.

Still further safety features will have become apparent from the foregoing detailed description of the gun parts and hence need no repeated emphasis here. It will suffice to say that all of the gun parts have been designed with a view to maintaining the highest utility of each and to assuring that the entire breech block operating and firing mechanism will effectively function under the most adverse conditions of use and will offer the minimum of opportunity for unauthorized tampering by the gun user.

Contributing to the latter advantage is the comparatively complete manner in which all moving gun parts are enclosed (by the channel hinge bar 71 and in other ways) and hence safeguarded from mechanical injury or unauthorized contact from the outside. In consequence the new breech operating and firing mechanism is capable of standing rough handling and other abuse, and provides trouble-free operation under all service conditions including the most adverse.

Advantages re assembly and disassembly

In the gun's breech and firing mechanism here shown the overall structure has been significantly simplified, the number of parts needed has been reduced to a minimum, and those parts have been arranged in the uniquely compact and "dual functioning" manner already observed. Assembly and disassembly of the entire gun has in consequence been simplified, and both the time and skill required to effect such assembly and disassembly have been materially lowered. In addition incorrect assembly of parts is rendered impossible. The relative ease with which assembly and disassembly may be effected will become evident from the following outline of the procedure involved.

Operations incident to assembly will first be considered. Starting with the complete firearm of Fig. 1 stripped of all the removable parts but with chamber 67 affixed to barrel 66 as shown in Fig. 8, the chamber liner 68 (Figs. 8-9) is first screwed into the threaded rear interior of chamber 67. Coating of the threads 88 with graphite suspended in castor oil precedes this operation. Same is continued until the reliner end comes flush with chamber, and the reliner lug 87 (see Fig. 56) slotted to receive the extractor 147 and the detent 154 lines up with the chamber's right or "hinge" side with the bolt openings for the hinge block 83 mating as shown in Figs. 10-11.

The hinge block 83 is now fastened to the chamber 67 by insertion of cap screws 79, 112 (Fig. 11) and 114 (Figs. 3, 19 etc.) followed by a preliminary tightening thereof. Cap screws 76 are not inserted until later.

The trigger spring 137 is next inserted into trigger block 69 in the position of Fig. 13; the trigger 73 is then slid into the block bore so that slot 141 in the trigger shank engages the crossed end of the spring as shown in Figs. 23-23A with the trigger arm and lanyard hole pointing toward the block rear; the spring is now wound by rotating the trigger clockwise until centered over the under cut in the trigger block; and the trigger is then pushed into the under cut into the position of Figs. 13 and 20. Key 138 is next inserted into the trigger block for the mating engagement with trigger shank slot 139 which Figs. 21-21A show; the thus assembled block is fastened to the chamber by insertion of cap screws 115 and 116 (Figs. 3, 5, 16, 17); and the trigger action is checked to make sure that spring 137 freely returns the trigger to the rear of the block under cut as represented in Fig. 20.

The case holding detent 154 (Figs. 44, 46, 57), is now assembled into the weapon. This involves placing spring 158 into the end hole of the detent (see Figs. 38, 57) and following same by plug 159; inserting the notched fulcrum 155 into the side hole in the detent and rotatively manipulating it as earlier described (as by preliminary insertion of fulcrum tongues 156 into chamber reliner slots 157) to compress spring 158 sufficiently to prevent return to the uncompressed position; with the detent spring so compressed finally installing the detent in the manner shown by Figs. 44 and 57 in a way that the spring urges the offset end against the central ring-like portion of chamber liner 68 as shown by Fig. 44.

Placement of the coupling plate 106 into the rear recess of breech block 70 (as shown in Figs. 35, 38 and 46) comes next. These two parts are so rotatively manipulated that the two holes in the coupling plate align with the slots 118 in the breech block 70 (see Fig. 36); and the two roller pins 117 are now inserted through the coupling plate 106 into the breech block slots 118 as shown in Figs. 36-37.

The firing hammer housing 105 is now inserted from the breech block front into the central openings in breech block 70 and coupling ring 106 so that the forward shank on the housing engages the block as shown in Figs. 35-35A, 38, 57. The cam plate 107 is next laid on the coupling plate side of the breech block around the firing pin housing 105 so that the cam slots 119—120 engage the two roller pins 117 in the manner represented by Figs. 19, 36-37-38 and 45.

The angle point of cocking cam 135 is now inserted into the rectangular slot of firing pin housing 105 as shown in Fig. 35 and the tang on the opposite end of this cocking cam is placed into the mating hole in the plate cam as shown in Figs. 35, 46, 57 and 58. This is followed by inserting the extractor 147 through the lengthwise slot in the right end of cam plate 107 with the extractor shank across the threads 88 of breech block 70 and the extractor hook 148 pointing towards the breech block, all as shown by Figs. 45-46. Extractor spring 150 is next inserted and followed by spring pin 151 as shown by Fig. 38.

Placement of the sear 126 into the left end of hinge bar 71 now follows. This is accomplished by inserting the small or right end of the sear into an opening into the left end of the hinge bar and leaving the left or tongued end of the sear protruding somewhat from the bar end.

At this point the hinge bar 71 is placed over the breech block 70, cam plate 107 and other assembled parts in the general relation shown by Figs. 19 and 46 and with the rear portion of the firing hammer housing 105 through the hole near the center of bar 71. The sear 126 is next rotated so that the flat 146 thereof is towards the back of hinge bar 71 as shown in Fig. 49.

With the parts thus assembled cap 109 is screwed on to the hammer housing 105 by hand as far as it will go. This clamps the hinge bar 71 almost against the breech block 70 and if the parts are in their correct place no force need be exerted. Use of a wrench at this point is not recommended. The sear 126 is now further pushed to the right into the hinge bar 71 so that only the sear tongue 140 protrudes from the left end of the bar.

Facing the breech block side of the above assembly, the person assembling the gun rotates the breech block 70 clockwise through an angle of about 45 degrees. It may be necessary to depress the extractor 147 in the adjoining end of cam plate 107 to complete this motion. Roller pin 123 is now placed into the small hole in the dog 121; this pin 123 is next inserted into the slot 124 in the right end of cam plate 107 with the flat 127 on the dog towards the breech block and lying against the cam plate as shown in Fig. 46; and the above assembly is then placed against the gun chamber's open end with the dog 121 in the central slot of hinge block 83 and the breech block 70 in the chamber reliner as shown by Figs. 42-43, 45-46.

Installation of operating handle 72 now follows. The end ball 104 is first screwed on to the handle stem; key 122 is fitted into the slot in the handle stem (Figs. 46, 57) and the handle is downwardly inserted into its mating opening in hinge block 83 with key 122 aligned with insertion slot 161 in the block's upper portion (see Figs. 51-51A); and this downward insertion is continued until the shoulder on the handle 72 rests on top of hinge block 83.

The handle 72 is now pushed forward moving cam plate 107 fully to the left and locking breech block 70 into chamber liner 68. At this point cap screws 76 (see Fig. 10) are inserted through the breech block thereby securing the handle in place by the engagement of the cap screws with the handle shank which Figs. 34, 51-51A represent. These and all other hinge block cap screws are now tightened.

At this point cap 109 (previously tightened by hand only) is removed from firing pin housing 105; the firing pin 90 and integral hammer 108 are now inserted with the hammer's side slot to the right in alignment with pin 135 (see Fig. 29); firing pin spring 134 now follows the hammer into housing 105; while pressing on the spring, trigger 73 is actuated to check forward movement of the spring and hammer which indicates proper assembly; and cap 109 is screwed on to the rear of hammer housing 105 by hand and finally tightened by wrench. This puts the hammer spring under the necessary compression and completes assembly of the weapon.

To disassemble the weapon, the assembly steps just detailed may be repeated in reverse sequence. Because of their close similarity no attempt will here be made to detail same. It will instead suffice to say that the ease which characterizes putting the weapon together also typifies disassembly operations.

If desired, the following shortened procedure of disassembly also may be followed. Remove hinge block cap screw 76; unlock the breech block 70; remove the hammer housing cap 109; remove firing hammer 108 and spring 134; replace hammer housing cap 109; pull handle 72 upwardly out of hinge block 83; remove the entire breech block and hinge bar assembly 70—71 from the gun; depress extractor 147 and rotate breech block 70 through 45 degrees or until locking lugs 86 are in line with the body of hinge bar 71; pull out sear 126 from hinge bar 71 as far as it will go; remove cap 109 from hammer housing 105; and finally remove hinge bar 71 from breech block 70 and other cooperating parts.

*Summary*

The earlier described qualities of superior breech operating and firing mechanism design are the direct result of the several improvements here disclosed. The individual features of such improvements are numerous and in the complete weapon these features effect the named results through cooperations and interactions which are both unique and novel.

It will by now have become apparent that these breech operating and firing mechanism improvements may also be applied to guns of sizes, characters and shapes other than the one here disclosed, and that the represented 105 mm. open-breech weapon thus has been chosen only to illustrate and not to limit the inherently wide application and scope by which these improvements are characterized.

From the foregoing it will thus be seen that the here disclosed improvements have enabled provision of light weight and otherwise superior designs for heavy caliber recoilless guns which incorporate principles of construction previously disclosed and claimed by the four co-pending applications earlier listed herein; that these same improvements have made available a unique gun construction which reduces the time and skill required to safely load and fire recoilless weapon of heavy caliber typified by 105 mm. barrel diameter; that the improvements have resulted in simplifying the structure and reducing the number of parts needed by the gun's breech and firing mechanism and have provided a uniquely compact arrangement for those parts; that the improvements incorporate "foolproof" constructions which assure simplicity of assembly and which make incorrect assembly impossible; that they have enabled such complete enclosure of the breech and firing mechanism parts as will assure trouble-free operation under all service conditions including the most adverse; that they have provided for the guarding of all critical parts of the gun against possible mechanical damage due to rough handling and other abuse; that they have incorporated "double safety" features into the breech and firing mechanism design; and that they have assured positive retention of the ammunition round in the gun while the breech is being closed preparatory to high elevation firing.

The inventive improvements here disclosed thus are capable of wide application and hence are not to be restricted to the specific form here shown and described by way of illustration.

I claim:

1. In a gun, the combination of a chamber, a breech block movable into and out of the rearward portion of said chamber, a hinge bar rotatively supporting said breech block at its center and extending across the chamber end, an operating handle pivoting one end of said hinge bar to a support on one side of the rear chamber wall, a cam plate carried by said hinge bar and disposed thereon so as to be movable by said handle lengthwise of said hinge bar when that bar is closed against the chamber end, means operatively associated with said cam plate and in engagement with said breech block at diametrically opposed parts thereof and being responsive to said cam plate's movement so as to rotate said breech block between locked and unlocked positions within the chamber by applying turning forces at diametrically opposed places on said breech block, a firing pin hammer carried by said breech block and resiliently urged towards a forward released position, means effective upon each of said lengthwise cam plate movements that unlocks said breech block for camming said hammer rearwardly into a cocked position, and means effective when said cam plate reaches its limit of travel in said block unlocking direction for directly coupling said handle to said hinge bar whereby further handle movement in the block-unlocking direction swings said hinge bar outwardly away from the chamber end thereby withdrawing said breech block from the chamber with said block-carried hammer in the cocked position.

2. In a gun, the combination of a chamber, a breech block movable into and out of the rearward portion of said chamber and being secured therein when rotated to a locked position and freed for withdrawal therefrom when rotated to an unlocked position, a hinge bar rotatively supporting said breech block at its center and extending across the chamber end, an operating handle pivoting one end of said hinge bar to a support on one side of the rear chamber wall, a cam plate carried by said hinge bar and in engagement with said breech block at diametrically opposed parts thereof and disposed in said hinge bar so as to be slidable by said handle lengthwise of said hinge bar for the purpose of rotating said breech block between the two positions named by applying turning forces to said breech block at diametrically opposed places thereon, a firing pin hammer disposed within said breech block and movable axially thereof between a forward released position and a rear cocked position, a spring urging said hammer toward said forward released position, a cocking cam carried by said cam plate and effective upon each said lengthwise cam plate movement that rotates said breech block from said locked to said unlocked position for camming said hammer rearwardly against said spring and into said cocked position, and rod-like sear means carried by said hinge bar and rotatable about its own axis to releasably engage said hammer and latch it in its said cocked position against the force of said spring.

3. In a gun, the combination of a chamber, a breech block movable into and out of the rearward portion of said chamber, a hinge bar rotatively supporting said breech block at its center and extending across the chamber end, an operating handle pivoting one end of said hinge bar to a support on one side of the rear chamber wall, a cam plate carried by said hinge bar and disposed thereon so as to be movable by said handle lengthwise of said hinge bar, a coupling ring operatively associated with said cam plate and in engagement with said breech block at diametrically opposed parts thereof and being responsive to said cam plate's movement so as to rotate said breech block between locked and unlocked positions in said chamber by applying turning forces to said breech block at diametrically opposed places thereon, a firing pin hammer disposed centrally of said breech block and movable axially with respect thereto between a forward released position and a rear cocked position, a spring urging said hammer towards said forward released position, a cocking cam carried by said cam plate and effective upon each said lengthwise cam plate movement that rotates the breech block from said locked to said unlocked position for camming said hammer rearwardly against said spring and into said cocked position, a rod-like sear in said hinge bar extending from said hammer at the breech block's center to said hinge bar's free end and being rotatable about its own axis, means tending to keep said sear rod so rotatively positioned as releasably to latch said hammer in said cocked position against the force of said spring, and trigger means on said chamber in alignment with said sear and engageable therewith when said hinge bar is in a closed position relative to said chamber so as to be effective at proper times to rotate said sear rod to a firing position in which the sear unlatches said hammer and allows same to move forward under the force of said spring.

4. In a gun, the combination of a chamber, a breech block movable into and out of the rearward portion of said chamber, a firing pin hammer disposed centrally of said breech block and movable axially with respect thereto between a forward released position and a rear cocked position, a spring urging said hammer towards said forward released position, a hinge block on said chamber, a hinge bar extending from the center of said breech block radially in one direction to said hinge block and radially in the other direction to the opposite chamber side and permitting rotative movement of said block between locked and unlocked rotative positions within the chamber, an operating handle pivoting one end of said hinge bar to said hinge block, a cam plate carried by said hinge bar and disposed thereon so as to be movable by said handle lengthwise of said hinge bar, a coupling ring between said breech block and said cam plate and operatively associated with said cam plate and in engagement with said breech block at diametrically opposed parts thereof and also being responsive to said cam plate's movement so as to rotate said breech block between the two positions named by applying turning forces to said breech block at diametrically opposed places thereon, a cocking cam carried by said cam plate and effective upon each said lengthwise cam plate movement that rotates the breech block from said locked to said unlocked position for camming said hammer rearwardly against said spring and into said cocked position, a rod-like sear rotatable about its own axis in said hinge bar and extending from said hammer at the breech block's center to said hinge bar's free end and having a cut-away side registerable with said hammer by rotation of said sear, resilient means tending to keep said sear so rotated that the cut-away side is out of register with said hammer whereby the sear then releasably latches the hammer in said cocked position against the force of said spring, and trigger means on said chamber in alignment with said sear and engageable therewith when said hinge bar is in a closed position relative to said chamber so as to be effective at proper times to rotate the cut away side of said sear into registry with said hammer whereby to unlatch and allow forward movement of same under the force of said spring.

5. In a gun, the combination of a chamber, a breech block in the rear portion thereof, a hinge block on said chamber at the breech end thereof, a hinge bar extending from the center of said breech block radially in one direction to said hinge block and radially in the other direction to the opposite chamber side, an operating handle pivoting one end of said hinge bar to said hinge block, a cam plate carried by said hinge bar and disposed thereon so as to be movable by said handle lengthwise of said hinge bar, a coupling ring between said breech block and said cam plate and operatively associated with said cam plate and in engagement with said breech block at diametrically opposed parts thereof and also being responsive to said cam plate's movement so as to rotate said breech block between locked and unlocked positions within the chamber by applying turning forces to said breech block at diametrically opposed places thereon, a firing pin hammer disposed centrally of said breech block and movable axially with respect thereto between a forward released position and a rear cocked position, a spring urging said hammer towards said forward released position, a cocking cam carried by said cam plate and effective upon each said lengthwise cam plate movement that rotates the breech block from said locked to said unlocked position for camming said hammer rearwardly against said spring and into said cocked position, a rod-like sear rotatable about its own axis in said hinge bar and extending from said hammer at the breech block's center to said hinge bar's free end, means on said sear and cooperating with part of said hinge bar so as to be effective at all times that said breech block is out of said locked position for so holding said sear so rotated that said sear latches said hammer in said cocked position against the force of said spring, a trigger mounted on said chamber opposite said hinge block, and means effective when and only when said breech block fully occupies its said locked position for coupling said trigger to said sear in a way enabling the former to rotate the latter to a firing position in which the sear unlatches said hammer and allows same to move forward under the force of said spring.

6. In a gun, the combination of a chamber, a breech block movable into and out of the rearward portion of said chamber, a hinge bar rotatively supporting said breech block at its center and extending completely across the chamber end, an operating handle pivoting one end of said hinge bar to a hinge support on one side of the rear chamber wall and effective to swing the bar and breech block toward and away from the chamber end, a trigger housing on the opposite side of said chamber engageable by said hinge bar's free end, a rotatable trigger in said housing, a cam plate carried by said hinge bar and disposed thereon so as to be movable by said handle lengthwise of said hinge bar when that bar is closed against the chamber end, a coupling ring between said breech block and said cam plate and operatively associated with said cam plate and in engagement with said breech block at diametrically opposed parts thereof and also being responsive to said cam plate's movement so as to rotate said breech block between locked and unlocked positions within the chamber by applying turning forces to said breech block at diametrically opposed places thereon, a firing pin hammer disposed in said breech block and resiliently urged toward a forward released position, a cocking cam carried by said cam plate and effective upon each said lengthwise cam plate movement that rotates the breech block from said locked to said unlocked position for camming said hammer rearwardly into a cocked position, a rod-like sear rotatable about its own axis in said hinge bar and extending from said hammer to the bar's said free end for engagement with said trigger and so rotatively held as to latch the hammer in said cocked position, means on said sear and said cam plate effective when said breech block occupies its said unlocked rotative position for keeping said sear fully disengaged from said trigger whereby then to render release of said hammer impossible, and means on said cam plate effective when and only when said hinge bar is closed against the chamber end and said breech block is in its said locked position for projecting the end of said rod-like sear into said trigger whereby then to couple the sear to the trigger in a way enabling the latter to rotate the former to a firing position in which the sear unlatches said hammer and allows same to move forward.

7. In a gun, the combination of a chamber, a breech block movable into and out of the rearward portion of said chamber, a hinge block on said chamber at the breech end thereof, a hinge bar rotatively supporting said breech block at its center and extending completely across the chamber end, an operating handle pivoting one end of said hinge bar to said hinge block and effective to swing said bar and breech block toward and away from the chamber end, a trigger housing on said chamber opposite said hinge block and engageable by said hinge bar's free end, a rotatable trigger in said housing, a cam plate carried by said hinge bar and disposed thereon so as to be movable by said handle lengthwise of said hinge bar when that bar is closed against the chamber end, a coupling ring between said breech block and said cam plate and operatively associated with said cam plate and in engagement with said breech block at diametrically opposed parts thereof and also being responsive to said cam plate's movement so as to rotate said breech block between locked and unlocked positions within the chamber by applying turning forces to said breech block at diametrically opposed places thereon, a firing pin hammer carried by said breech block and resiliently urged towards a forward released position, a cocking cam carried by said cam plate and effective upon each said lengthwise cam plate movement that rotates the breech block from said locked to said unlocked position for camming said hammer rearwardly into a cocked position, a rod-like sear rotatable about its own axis in said hinge bar and extending from said hammer to the bar's free end and there engageable at proper times with said trigger, means on said sear and said cam plate effective when said breech block is rotatively unlocked for withdrawing said sear rod from said trigger, other means on said sear and on said hinge bar effective for holding said sear rod so rotated that same latches said hammer in the cocked position, and means on said cam plate for projecting the end of said sear rod into said trigger housing when and only when said hinge bar is closed against the chamber end and said breech block occupies its said locked position whereby then to latch the hinge bar closed and to couple said sear rod to said trigger in a way enabling the latter to rotate the former to a firing position in which the sear rod unlatches said hammer and allows same to move forward.

References Cited in the file of this patent

UNITED STATES PATENTS

| | | |
|---|---|---|
| 447,228 | Canet | Feb. 24, 1891 |
| 542,379 | Silfersparre | July 9, 1895 |
| 628,870 | Tompkins | July 11, 1899 |
| 629,673 | Fletcher | July 25, 1899 |
| 1,326,712 | Dawson et al. | Dec. 30, 1919 |
| 1,420,972 | Dawson et al. | June 27, 1922 |
| 2,480,328 | Johnston | Aug. 30, 1949 |